United States Patent
Gheorghe et al.

(10) Patent No.: US 7,434,234 B2
(45) Date of Patent: Oct. 7, 2008

(54) METHOD AND SYSTEM FOR FACILITATING COMMUNICATIONS IN A NETWORK USING ON DEMAND DISTRIBUTION

(75) Inventors: Christian Gheorghe, Denver, CO (US); Qingwei Lou, Englewood, CO (US)

(73) Assignee: OutlookSoft Corporation, Stamford, CT (US)

( * ) Notice: Subject to any disclaimer, the term of this patent is extended or adjusted under 35 U.S.C. 154(b) by 441 days.

(21) Appl. No.: 10/138,136

(22) Filed: May 1, 2002

(65) Prior Publication Data

US 2003/0131053 A1 Jul. 10, 2003

Related U.S. Application Data

(60) Provisional application No. 60/288,909, filed on May 4, 2001.

(51) Int. Cl.
*G06F 3/00* (2006.01)
*G06F 9/44* (2006.01)
*G06F 9/46* (2006.01)
*G06F 13/00* (2006.01)
*G06F 15/16* (2006.01)

(52) U.S. Cl. ............... 719/330; 719/313; 719/315; 719/328; 709/201

(58) Field of Classification Search ............ 719/315, 719/310, 313, 318, 328–330; 718/328–330; 718/318; 709/201–203; 712/28
See application file for complete search history.

(56) References Cited

U.S. PATENT DOCUMENTS

| | | | |
|---|---|---|---|
| 6,654,793 B1 * | 11/2003 | Wollrath et al. | 709/217 |
| 6,708,171 B1 * | 3/2004 | Waldo et al. | 707/10 |
| 6,735,771 B1 * | 5/2004 | Houlding | 719/315 |
| 6,757,729 B1 * | 6/2004 | Devarakonda et al. | 709/226 |
| 6,839,897 B2 * | 1/2005 | Takagi | 719/330 |
| 2002/0133635 A1 * | 9/2002 | Schechter et al. | 709/310 |

* cited by examiner

*Primary Examiner*—Meng-Ai An
*Assistant Examiner*—Qing-Yuan Wu
(74) *Attorney, Agent, or Firm*—Buckley, Maschoff & Talwalkar LLC

(57) ABSTRACT

A system using a touch-point specific stub in communication with a stub specific object provides efficient and effective communications between a server operation running the stub specific object and a touch-point running the touch-point specific stub. An On Demand Distribution Service (ODD) distributes the stub to a touch-point and selects and initializes the object such that communications between the stub and the object is established.

14 Claims, 10 Drawing Sheets

METHOD AND SYSTEM FOR FACILITATING COMMUNICATIONS IN A NETWORK USING ON DEMAND DISTRIBUTION

CROSS REFERENCE TO RELATED APPLICATION

This application claims priority to provisional patent application entitled "Method and System for Facilitating Communications in a Network Using on Demand Distribution," Application Ser. No. 60/288,909, filed May 4, 2001.

BACKGROUND OF THE INVENTION

In computer networks, information and/or services are typically shared between two or more computing devices. The relationship between various computing devices on a network may be described in terms of a model known as the client/server model. In the client server model computing devices on a computer network are categorized according to whether they are providing information ("server") or receiving information ("client"). In this sense, a server may be defined as a computing device, or a computer program being run on a computing device that waits for and handles requests for data, e-mail, file transfers, etc., from one or more clients. Conversely, a client may be defined as a computing device or program that makes a request to the server and uses the data or services of another computing device or program (server).

One common variation of the client/server model is known as peer-to-peer. In the peer-to-peer model each computing device may operate as either or both the server and the client. Typically this is accomplished by all computing devices in the peer-to-peer network having the same networking program to connect with each other. These computing devices may then access files from one another directly or with the use of a mediating server.

The Internet is one example of a computer network. The Internet may be used either in the client/server model or in the peer-to-peer model. As each computer in the peer-to-peer model is at some point a client or a server, the term client/server, as used herein, will apply both to the client/server as well as the peer-to-peer relationship.

The Internet may be broadly defined as a worldwide network of interconnected computers or computing devices. With respect to the Internet, the "client" typically refers to a computer or computer processes that is used to access content on various computing devices ("servers") or computer processes located on or within the Internet. Typically, when a user logs onto the Internet or the World Wide Web (WWW), using a client computing device, the user views "Web pages" that are stored on remote servers (Web site servers) connected to the Internet or the WWW. Information including data files and the Web pages are often shared and transferred between the client and the server.

Web site servers typically employ one or more computer systems to interface with clients accessing the Web site. Web site servers maintain or employ, among other things, programs and resources that manage the operations and information of the server. The function of a server is often broken down or classified according to the various functionality that is provided by the Web site server. For example, a Web site server may be defined as having a Web server, an application server, and a legacy server. Using this type of classification, a Web server may be broadly described as a computer process, computer processes, or one or more computing devices running at a Web site which sends out Web pages in response to requests from a client. An application server may be described as computer process, computer processes, or one or more computing devices which handle interactions and communications between the Web server and various backend business applications and Web server and the legacy server. A legacy server may be defined as a program or programs and/or a database containing various information which is accessed by the Web server via the application server. Typically, legacy servers manage one or more databases.

Typically, application servers employ an Application Programming Interface (API). An API may be thought of as an interface between the server's operating system and various application programs. APIs typically specify the way in which various application programs communicate with the operating system and the resources or services that an operating system makes available to the application programs.

As previously discussed, servers maintain resources that may be shared through the Internet and are capable of processing a client request to access those resources. In order to share resources, clients and servers must communicate over a defined communications protocol. The Hyper Text Transfer Protocol (HTTP) is the primary communications protocol that is used for communication between servers and clients on the WWW. A typical client/server interaction using HTTP comprises establishing a connection between the client and the server, performing a request for data, and terminating the connection. According to the HTTP protocol, the server does not maintain any state about the connection once it has been terminated. HTTP is, therefore, a stateless application protocol. Consequently, each time the client requests information from the server using the HTTP protocol, a new connection must be established between the server and the client.

In order to navigate the vast amount of information located on the multitude of servers located on the WWW, and to easily view the information sent from a server and/or to run applications sent from a server, clients typically employ a software application known as a Web browser, or simply browser. A browser may generally be described as a user-friendly interface located on a client that allows a user to communicate requests to a server and receive information from the server without requiring the user of the client to learn a complicated command syntax. Browsers typically provide a graphical user interface (GUI) for displaying information from a server and for receiving input from a client.

During a typical client/server interaction on the WWW, a browser is used on the client to send a request to the server for information, such as a request to view a particular Web page. After receiving the request from the client, the server transmits the requested information to the client as a document which is encoded using a markup language. Upon receiving the encoded document, a browser on the client parses the encoded document and produces an image, such as a Web page, on the client based on the information in the encoded document. As such, it may be said that the encoded document defines the image or Web page that is rendered by the browser at runtime. In addition to displaying information or Web pages, a browser may also retrieve applications or programs from a server to be executed on the client. One example of a program that may be downloaded from a server and executed on a browser is a Java applet.

Browsers generally display information on a client as pages or documents. These pages or documents are typically encoded using what are referred to as markup languages. Generally speaking, a markup language defines a set of markup symbols or codes (tags) which are inserted into a file intended for display on a browser. In this sense, a markup language "tells" a browser how to display a Web page's words and images. For example, with respect to text, the markup language typically defines different heading styles, bold, italic, numbered lists, insertion of images, etc. Markup languages also typically define how hyperlinks are displayed and used. A hyper link is a link in a document that leads to another WWW site, or another place within the same document or Web page.

Currently, there are a number of markup languages which are in use on the WWW. The most prevalent of these markup languages is the Hyper-Text Markup Language (HTML). HTML is a derivative of the ISO defined Standard Generalized Markup Language (SGML). While HTML is the markup language formally recommended by the World Wide Web Consortium (W3C) and is generally adhered to by most browsers, a variety of proprietary dialect variations and nonstandard extensions, such as HTMLS and DHTML, etc., that depart from the published standard are employed on various servers and clients (browsers) across the WWW. These dialect variations present number of problems for Web site developers. Principal among these problems is that the dialect variations make it difficult or impossible for a Web site developer to be certain how the content of their Web pages will be displayed in the various browsers employing the HTML variations. As such, Web site developers often must spend countless hours testing the appearance of their Web pages using a number of different browsers to attempt to author HTML based Web pages which will provide a consistent and reliable display of content.

In addition to HTML, there are also a number of other alternative markup languages employed on the Internet or WWW. One of these alternative markup languages is the Extensible Markup Language (XML) which is similar to HTML in that both XML and HTML contain markup symbols to describe the contents of a Web page or file. However, while HTML describes the content of a Web page (mainly text and graphic images) only in terms of how it is to be displayed and interacted with, XML describes the content of a Web page in terms of what data is being described. Another difference between HTML and XML is that unlike HTML, where the number and type of markup symbols used is limited and predefined, the number and type of markup symbols in XML are unlimited and self-defining.

One markup language which is used to specify content and user interface for Wireless Application Protocol (WAP) devices, is the Handheld Device Markup Language (HDML). HDML is a vendor specific proprietary language which can only be viewed on mobile phones that use a vendor specific browser. There are a number of proprietary and non-proprietary derivatives of HDML including the Wireless Markup Language (WML). The main differences between HDML and WML are that WML can use a scripting language, and HDML has no scripting of any kind. Additionally, unlike HDML, WML is based on XML.

One problem that occurs as a result of the numerous markup languages is that often times multiple Web sites must be created and maintained to provide the same or similar information to clients using various different markup languages. For example, if a client, such as a PDA or a Webcompatible cellular phone employs WML, that PDA or a Web-compatible cellular phone would need to log onto a Web site designed specifically for delivering WML encoded content. This same situation would also be true for users of cellular phones employing HDML.

The Internet and the WWW typically employ what is known as a thin client/three tier architecture in which a browser executes only what is known as the presentation or display logic and the server executes the business logic. The display logic may be defined as the program, or part of a program, that receives data and, among other things, formats the received data for output on the client. The display logic typically is included as a part of the browser on the client. The display logic typically receives encoded files (HTML, etc.) or Web pages and displays the files or Web pages on the client within the GUI. The business logic may be defined as a program or part of the program that encodes the business rules associated with a particular problem domain. For example in an accounting application, the logic of how a particular account can be increased or decreased based on customer deposits or withdrawals is coded based on specific business rules for each particular bank. The business logic typically resides on the server side and it is coded separately from the display logic.

Many, if not all, of the above stated problems related to client/server relationship and the development of software to facilitate reliable and consistent communications between a client and a server stem from the fact that clients and servers are currently developed separately. Typically, clients are either developed to integrate with protocols and markup languages currently being employed on servers, or servers are designed to integrate with protocols and markup languages which are specific to a client. As such, valuable development time and resources are spent in an attempt to deal with the multiplicity of protocols and markup languages. Additionally, each time a new protocol or markup language is developed, client and server designers must decide whether to spend the appropriate time and resources to support the changes, thus taking valuable time and resources away from other development projects.

Another problem associated with the separate development of clients and servers is that the information sent to the client from the server must necessarily be somewhat generic in form and content to accommodate the various client devices. As such, the full capabilities and/or limitations of the client are not accounted for or accommodated for in, for example, the design of Web pages. Similarly, the separate development of the client and server, and the generic form and content that results, precludes optimization of communications bandwidth between the client and server.

It is with respect to these and other considerations that the present invention has been developed.

SUMMARY OF THE INVENTION

Against this backdrop the present invention has been developed. One aspect of the present invention relates to a system for overcoming the above noted problems by using a touch-point specific stub in communication with a stub specific object to provide efficient and effective communications between server operation in contact with or running the stub specific object and a touch-point running or in communication with the touch-point specific stub. Another aspect of the present invention relates to a service for distributing a touch-point specific stub to an appropriate touch-point and for selecting and initializing an appropriate stub specific object, such that communication between the object and the touch-point is established.

In accordance with these and other aspects of the present invention, one embodiment of the present invention relates to a method for establishing communication between a first touch-point and a first object associated with the first touch-point in a communications network environment including a plurality of touch-points and a plurality of objects. The steps of the method include: receiving a request for a stub operable to communicate with the first object; delivering the stub to the first touch-point; selecting from the plurality of objects the first object; and initializing the first object such that communication between the first object and the touch-point is established.

Another embodiment of the present invention relates to a system for communicating with a plurality of touch-points, the plurality of touch-points including a first type touch-point, the first type touch-point sending an object request. In accordance with this embodiment the system includes a plurality of objects, including a first object associated with the first type touch-point and configured to communicate with the first type touch point upon initialization of the first object. The system also includes a service module which receives the object request from the first type touch point and, in response, locates the first and initializes the first object, such that communication between the first object and the touch-point is established.

These and various other features as well as advantages which characterize the present invention will be apparent from a reading of the following detailed description and a review of the associated drawings.

DETAILED DESCRIPTION OF THE PREFERRED EMBODIMENT

In general, the present invention relates to unique methods and/or systems for efficiently and effectively communicating commands and events between computing devices in a networked environment. One embodiment of the present invention relates to a system including an On Demand Distribution service (ODD_Service), one or more On Demand Distribution objects (ODD_Objects), and one or more On Demand Distribution stubs (ODD_Stubs).

In this embodiment of the present invention, the ODD_Service is a computer implemented process or program which runs on a computing device, such as a network server, located in a network environment. The ODD_Service is operable to manage one or more ODD_Objects running on one or more servers in the network environment and to deploy one or more ODD_Stubs to touch-points located in the networked environment.

As with the ODD_Service, in this embodiment of the present invention, the ODD_Object is preferably a computer implemented process or program which runs on a computing device, such as a computer in the network environment. Once deployed by the ODD_Service, the ODD_Object communicates with one or more ODD_Stubs located in the network environment to provide presentation data in application specific format for efficient presentation to a user of a touch-point. As described in further detail below, the ODD_Object and ODD_Stub preferably communicate to each other using a proprietary communications protocol, thus providing a consistent communication path between the ODD_Object and the ODD_Stub.

Preferably, there are a number of specific types of ODD_Objects, each of which is associated with a specific type of touch-point. Each specific type of ODD_Object will preferably include touch-point specific logic operable to construct and transmit data and/or commands in accordance with the requirements of a specific type of touch-point. For example, a specific type of touch-point may have specific user interface capabilities and requirements. As such, an ODD_Object associated with that specific type of touch point would preferably include presentation logic which would correctly format information for presentation on the user interface of that specific type of touch-point. Each of these ODD_Objects may be implemented as a daemon process.

In this embodiment of the present invention, the ODD_Stub is preferably a computer implemented process or program which runs on a computing device, such as a touch-point, located in a network environment. The ODD_Stub is operable to format and communicate user events to the ODD_Object and to respond to actions from the ODD_Object. As mentioned above, the specific presentation logic required for a specific type of ODD_Stub is preferably implemented in a corresponding ODD_Object. However, if required, an ODD_Stub may contain all or some of the presentation logic.

Figure 1:
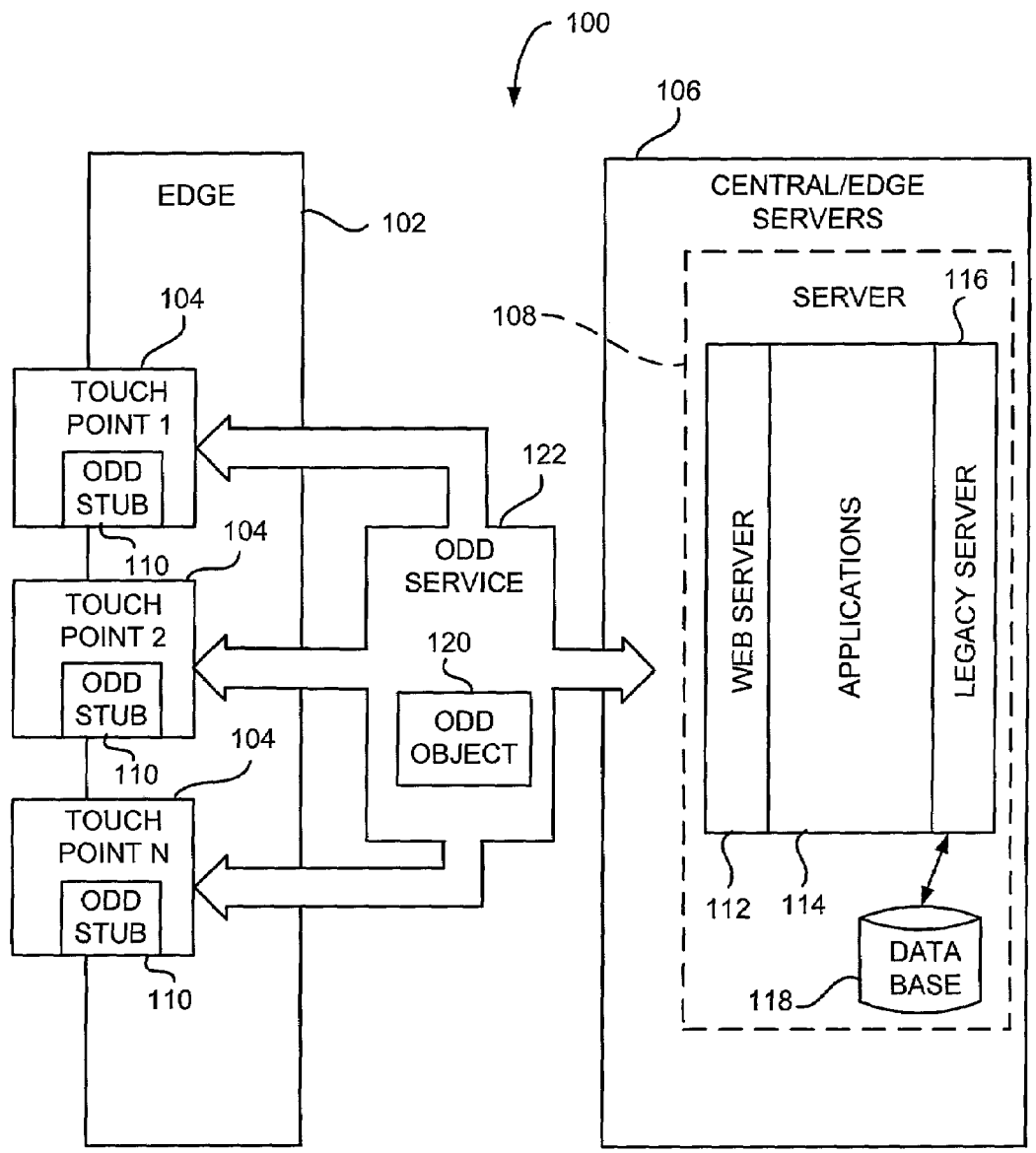
FIG. 1 is a block diagram illustrating various modules employed in communicating between a touch-point and a server in an embodiment of the present invention.

FIG. 1 illustrates a generalized operating environment for the present invention. In a preferred embodiment of the present invention the operating environment comprises a distributed network 100 of computing devices and equipment, such as the Internet or the World Wide Web (WWW). Included in this distributed network are an edge 102, including a number of touch points 104, and a central/edge server environment 106, including one or more servers 108. For simplicity, only one representative server 108 is shown in the central/edge server environment 106. As will be understood to those skilled in the art, a distributed network may include any number of servers 108.

In general terms, the edge 102 includes devices, including both touch-points 104 and/or servers 108, which receive content, actions, and/or commands from other devices in the distributed network 100. Generally, a touch point 104 may be defined as a general purpose or special purpose computing system, environment, or configuration. Examples of well known computing systems, environments, and/or configurations include, but are not limited to, personal computers, server computers, hand-held or laptop devices, cellular devices, multiprocessor systems, microprocessor-based systems, set top boxes, programmable consumer electronics, network PCs, minicomputers, mainframe computers, distributed computing environments that include any of the above systems or devices, and the like.

Each of the touch points 104 includes an ODD_Stub 110. As described in greater detail below, the ODD_Stub will preferably have been sent or pushed to the touch-point by the ODD_Service. However, it is to be understood that the ODD_Stub may have been placed on the touch-point by some other means, such as, for example, by the manufacturer of the touch-point during the touch-point manufacturing process. Each of the ODD_Stubs 110 provides a means for communicating with an ODD_Object 120.

The ODD_Object 120 is shown in FIG. 1 residing on or in the ODD_Service 122. The placement of the ODD_Object 120 on the ODD_Service 122 in this fashion in FIG. 1 is intended to make clear that the ODD_Object 120 may reside anywhere within the network environment 100. The operation and composition of the ODD_Object 120 is defined in greater detail below.

As shown in FIG. 1, the server 108 includes a Web server 112, an application server 114, and a legacy server 116. As is typical, the Web server 112 may be broadly described as a process running at a Web site which sends out Web pages in response to requests from a client. The application server 114 may be described as a program or programs which handle interactions and communications between the Web server and various backend business applications and/or between the Web server 112 and the legacy server 116. The legacy server 114 may be defined as a program or programs containing various information which is accessed by the Web server via the application server. Typically, legacy servers manage or include one or more databases 118.

As will be understood by one skilled in the art, the precise elements and/or functions of the Web server may or may not include, or be defined in terms of, a Web server, an applications server, and/or a legacy server. As such, the particular configuration of the various elements of the server 108 shown and described in FIG. 1 is not meant to limit the scope of the present invention. It will, therefore, be understood that any suitable computing system environment which functions to handle the requests from another device or process may substitute for the server 108 as shown in FIG. 1.

Figure 2:
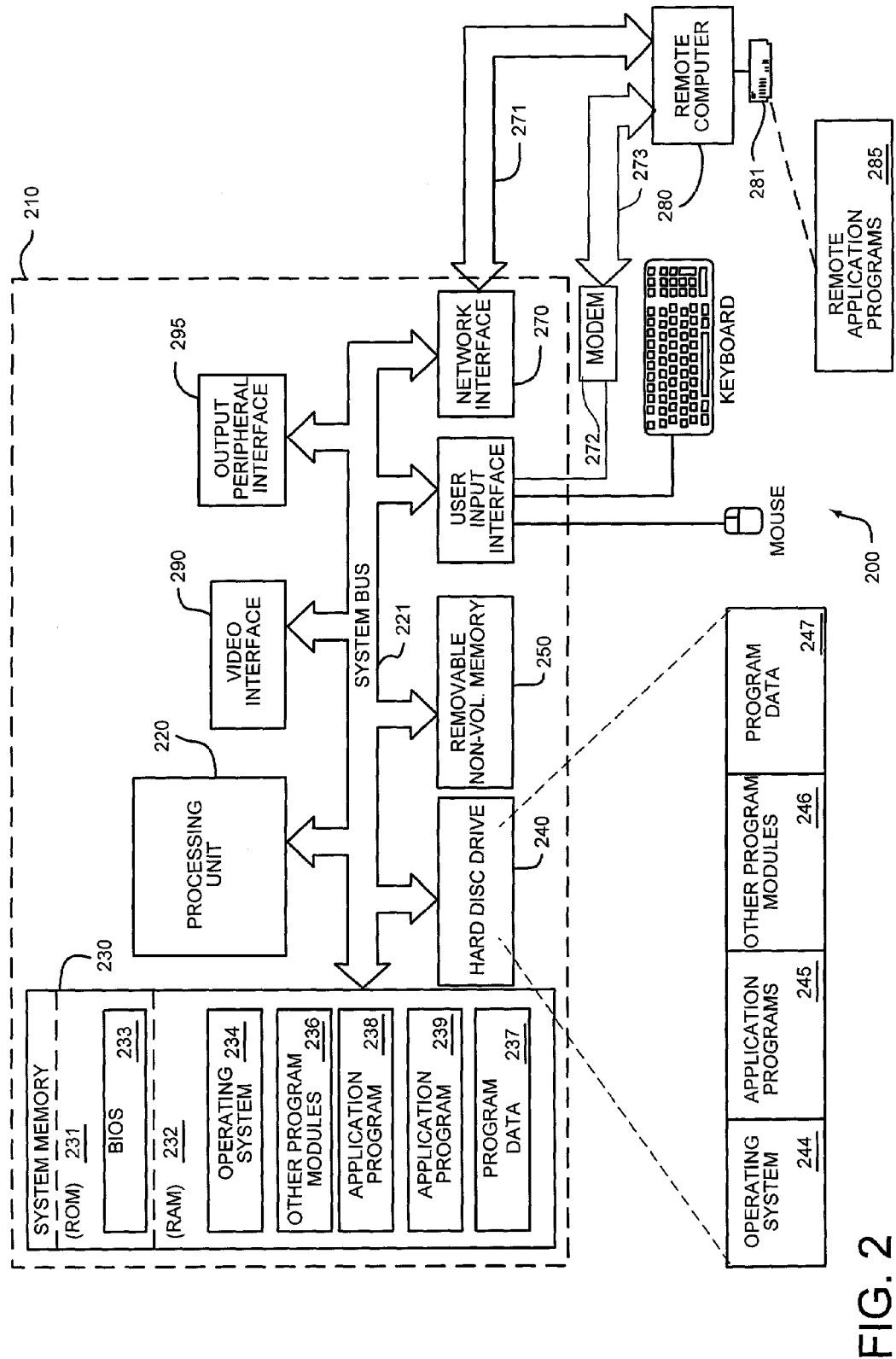
FIG. 2 is a block diagram of an exemplary computer system for practicing various aspects of the present invention.

FIG. 2 illustrates an example of a suitable computing system environment 200 on which the server 108 and/or the touch-points 104 may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary distributed network 100.

The various component or elements of the present invention, including the ODD_Service 122, the ODD_Object 120, the ODD_Stub 110, and the various server functions 112, 114, and/or 116 may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary computing system environment includes a general purpose computing device in the form of a computer 210. Components of the computer 210 may include, but are not limited to, a processing unit 220, a system memory 230, and a system bus 221 that couples various system components including the system memory to the processing unit 220. The computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 238 and 239, other program modules 236, and program data 237.

The computer 210 may also include other removable/non-removable, volatile/nonvolatile computer storage media, such as, without limitation, a hard disc drive 240 and/or a removable, nonvolatile memory 250.

The drives and their associated computer storage media discussed above and illustrated in FIG. 2, provide storage of computer readable instructions, data structures, program modules and other data for the computer 210. In FIG. 2, for example, hard disk drive 240 is illustrated as storing operating system 244, application programs 245, other program modules 246, and program data 247.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN)

271 and a wide area network (WAN) 273, but may also include other networks. Such networking environments are commonplace in offices, enterprise-wide computer networks, intranets and the Internet.

When used in a LAN or WAN networking environment, the computer 210 is connected to the LAN through a network interface 270 or a modem 272. In a networked environment, program modules depicted relative to the computer 210, or portions thereof, may be stored in the remote memory storage device. It will be appreciated that the network connections shown are exemplary and other means of establishing a communications link between the computers may be used.

Although many other internal components of the computer 210 are not shown, those of ordinary skill in the art will appreciate that such components and the interconnection are well known. Accordingly, additional details concerning the internal construction of the computer 210 need not be disclosed in connection with the present invention.

Figure 3:
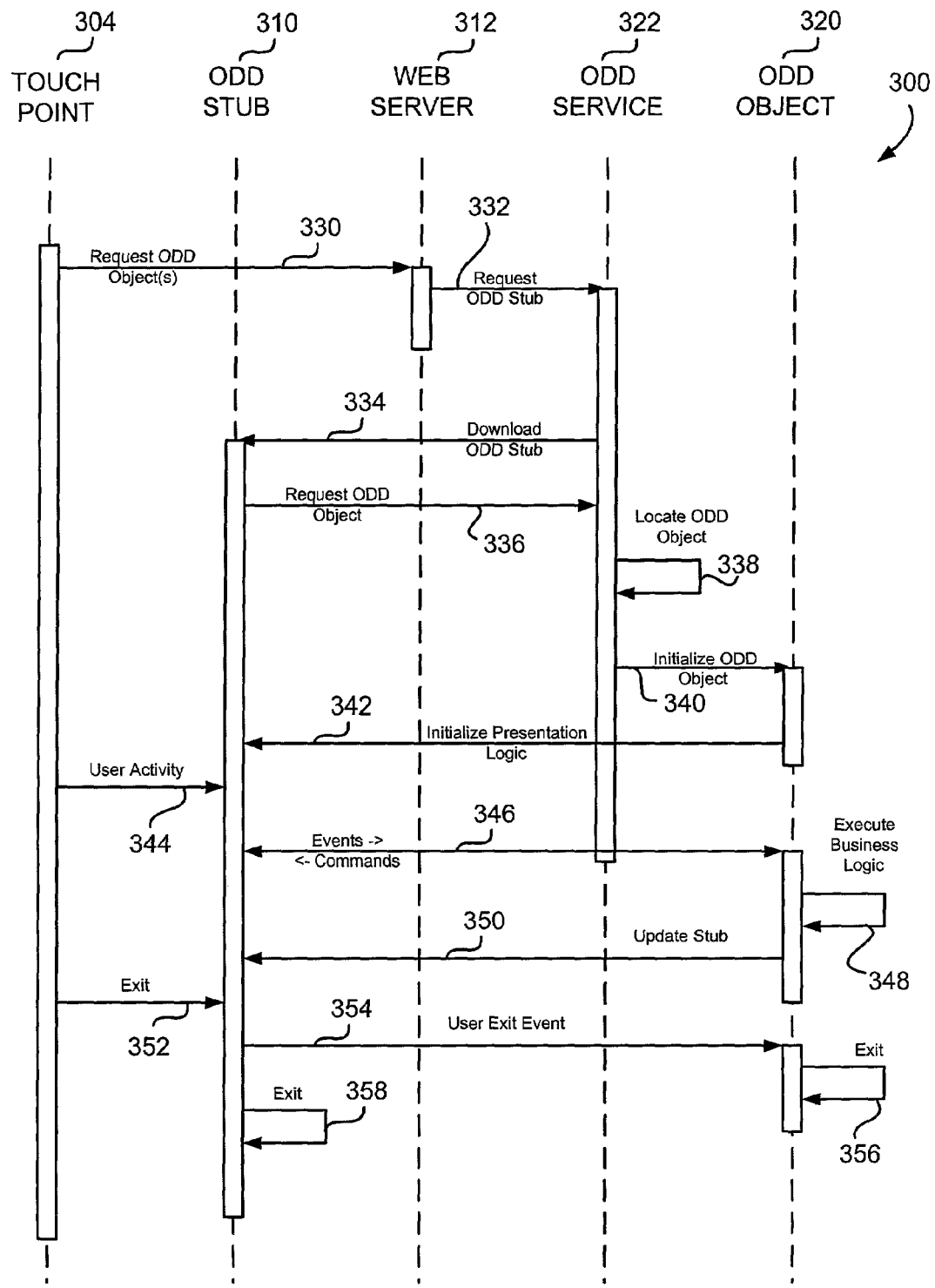
FIG. 3 is a sequence diagram illustrating the communications between various modules in an embodiment of the present invention.

Turning now to FIG. 3, an exemplary sequence diagram 300 is shown illustrating typical communications between a touch point 304, an ODD_Stub 310, a Web server 312, an ODD_Service 322, and an ODD_Object 320. As shown in FIG. 3, at the beginning of a communications session, the touch point 304 requests 330 an ODD_Object 320 from the Web server 312. This initial request 330 will typically be carried out using a communications protocol, such as HTTP. This initial request 330 may occur when the user logs on to a Website hosted by the Web server 312. Preferably, a header in the request will indicate the type, or characteristics of the touch-point 304 making the request 330, so that the server 108 may request an ODD_Stub which is appropriate for the specific type of touch-point making the request for an ODD_Object. After receiving the request 330 for the ODD_Object 320, the Web server requests 332 an appropriate ODD_Stub 310 from the ODD_Service 322. The ODD_Service 322 then on-demand, downloads 334 an ODD_Stub 322 which is associated with the type of touch-point 304 to the touch-point 304 which has made the initial request 330. That is, an ODD_Stub 310 which is compatible with the touch-point 304 is downloaded 334 to the touch-point 304.

Once the ODD_Stub 304 has been downloaded 334 to the touch-point 304 and initialized, the ODD_Stub 310 may request 336 an appropriate ODD_Object 320 from the ODD_Service 322. Upon receiving the request 336 for the ODD_Object 320, the ODD_Service 322 locates 338 the appropriate requested ODD_Object 320. After locating 338 the requested ODD_Object 320, the ODD_Service 322 initializes 340 the ODD_Object 320. Following initialization 340 of the requested ODD_Object 320, the ODD_Object initializes 342 the presentation logic and pushes the presentation towards the stub. Alternatively, a portion of the presentation logic could reside at the ODD_Object and a portion of the presentation logic could reside at the stub. In such a case, the majority of the presentation logic would preferably reside at the ODD_object, thus allowing the ODD_Object to handle the more processing intensive functions of the presentation logic. After the presentation logic has been initialized 342, the ODD_Stub 310 is ready for communications with the ODD_Object 320.

For example, as shown in FIG. 3, when the ODD_Stub 310 receives user activity 344, the ODD_Stub 310 sends events to the ODD_Object 320. The ODD_Object 320 then executes the business logic 348 which is appropriate for those events. Having executed the appropriate business logic 348, the ODD_Object 320 updates the ODD_Stub 310. Upon completion of all events or after a specified time, the touch-point 304 will send an exit message 352 to the ODD_Stub 304. The ODD_Stub 310 will then send an exit message 354 to the ODD_Object, which will then exit 356 or cease operations. A short time later, the ODD_Stub 304 will exit 358 or cease operations.

The sequence diagram 300 of FIG. 3 is but one example of a possible sequence of events occurring with, between, and/or with respect to the touch point 304, the ODD_Stub 310, the Web server 312, the ODD_Service 322, and the ODD_Object 320. As will be understood to one skilled in the art, any number of varying sequences of events may occur on or with respect to the touch point 304, the ODD_Stub 310, the Web server 312, the ODD_Service 322, and the ODD_Object 320.

Figure 4:
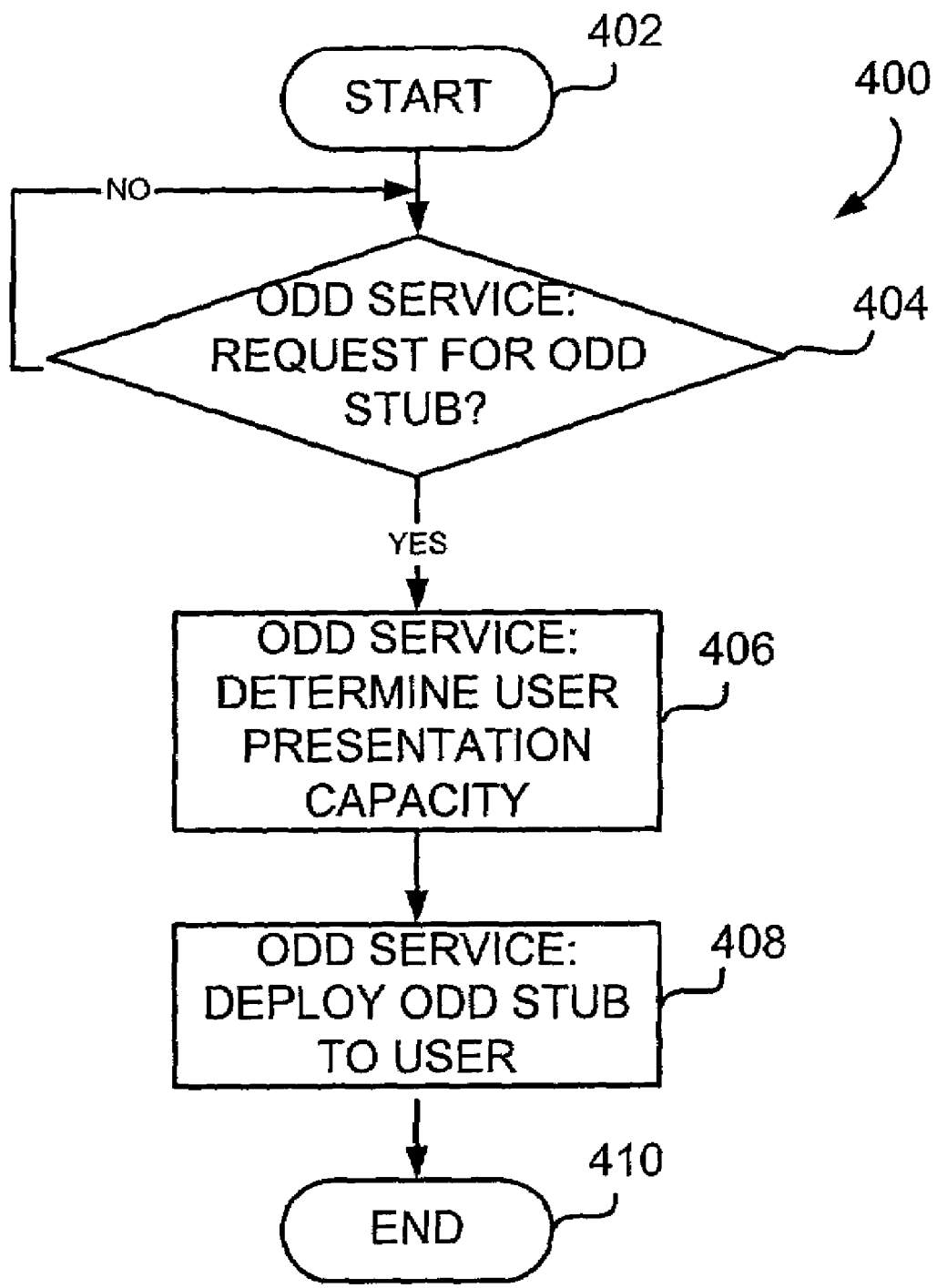
FIG. 4 illustrates an exemplary operational flow illustrating operations employed in obtaining an ODD_Stub from an ODD_Service in an embodiment of the present invention.
Figure 5:
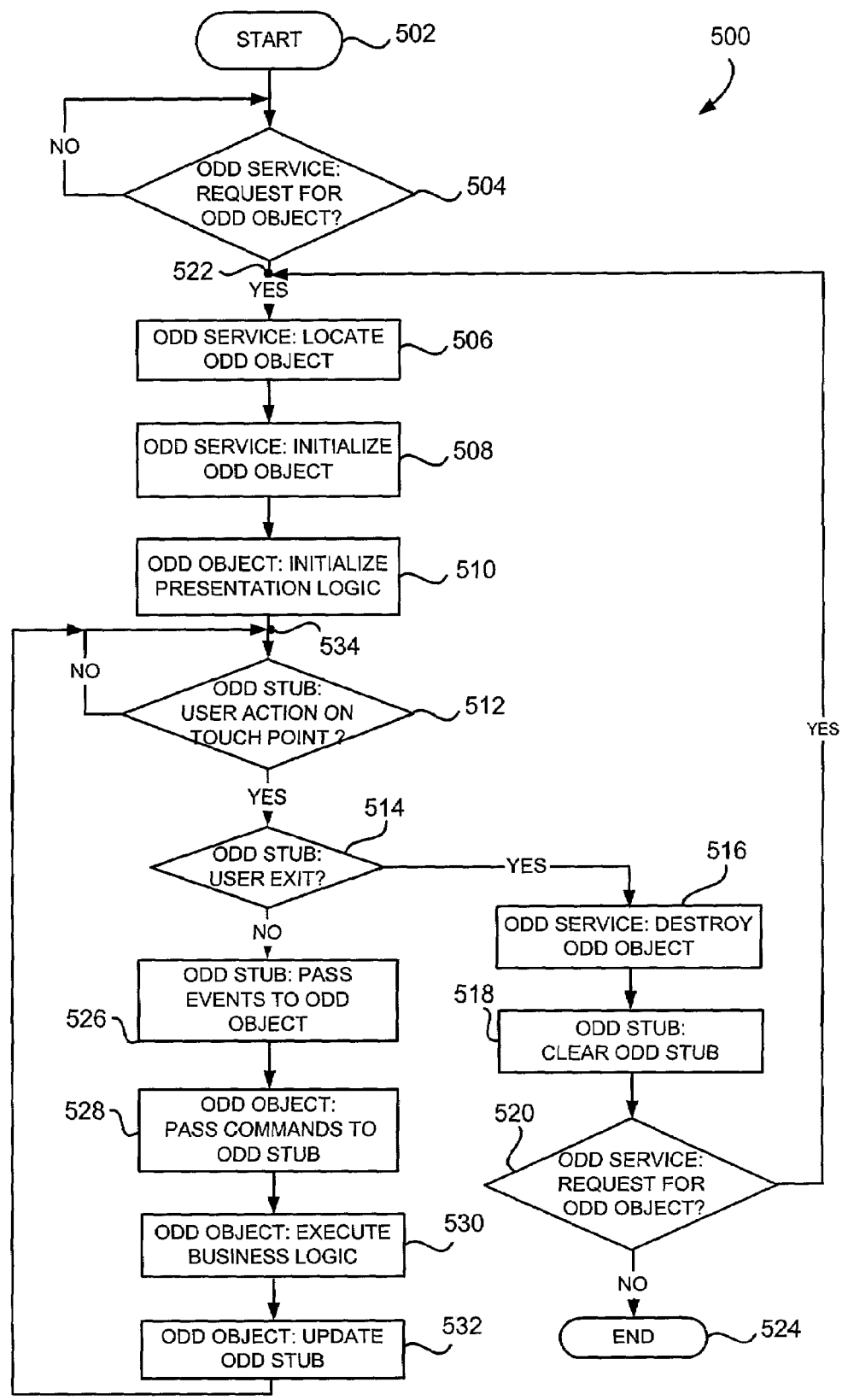
FIG. 5 illustrates an exemplary communications and operations between or with respect to touch-points, ODD_Stubs, Web servers, ODD_Services, and ODD_Objects in an embodiment of the present invention.

Turning now to FIGS. 4 and 5, what is shown are operational flow diagrams 400 and 500 illustrating the operations employed in obtaining an ODD_Stub from an ODD_Service and various exemplary communications and operations which may take place between or with respect to touch points 104, ODD_Stubs 110, Web servers 112, ODD_Services 122, and ODD_Objects 120. Each of the operations shown in FIGS. 4 and 5 indicate the particular process or device which is may be conducting or implementing the given operation. For example, as shown in the first operation 404 of FIG. 4, the determination operation 404 is preferably carried out by the ODD_Service 122. As will be understood by one skilled in the art, the operations such as those described with respect to FIGS. 4 and 5 may be carried out by any one or more apparatuses or functions. As such, the particular references to the carrying out of the various operations in FIGS. 4 and 5 by specific elements are meant to illustrate specific embodiments of the present invention and are not meant to limit the scope of the present invention.

As shown in FIG. 4, at the start 402 of the operation flow 400 an initial determination 404 is made by the ODD_Service 122 as to whether a request for an ODD_Stub 104 has been received. If a request for an ODD_Stub 110 has been received, a determination 406 is made regarding the presentation capacity of the touch-point 104. If a request for an ODD_Stub 104 has not been received, the determination 404 is made again by the ODD_Service 122 as to whether a request for an ODD_Stub 104 has been received. The presentation capacity of the user's device is typically indicated as a field or bit set within a request made by a touch-point 104 for an ODD_Object 120. If the presentation capacity has not been indicated in the request made by a touch-point request made by a touch-point 104, the ODD_Service 122 may poll the Web server 312 which in turn polls the appropriate touch-point 104 to determine the presentation capacity. Once the presentation capacity has been determined 406, the ODD_Service 122 deploys 408 the appropriate ODD_Stub to the touch-point 104 and the operational flow 400 is ended.

FIG. 5 is a generalized operation flow representing exemplary communications and operations which may take place between or with respect to touch points 104, ODD_Stubs 110, Web servers 112, ODD_Services 122, and ODD_Objects 120. As shown in FIG. 5, at the start 502 of the operation flow 500, the ODD_Service 122 is initially in a wait state, waiting for a request from the ODD_Stub 110 for an ODD_Object 120. The ODD_Service receives and decodes the request and determines the touch-point type. Upon a determination 504 that a request for an ODD_Object 120 from the ODD_Stub 110 has been made, the ODD_Service 122 locates 506 the appropriate ODD_Object 120. To locate 506 generally means to identify an ODD_Object of the appropriate type in the communications network. The located ODD_Object 120 is then initialized 508. To initialize 508 generally means to start the ODD_Object 120, or an associated function, running. Initialization 508 can also mean to create an ODD_Object 120, such as by software declaration or instantiation. Following initialization 508 of the ODD_Object 120, the ODD_Object 120 initializes 510 the appropriate presentation logic.

After initialization 510 of the presentation logic, the ODD_Stub is in a wait state, waiting for a user activity on the touch point 104. After determining 512 that a user activity has occurred on the touch point 104, a determination 514 is then made as to whether the user activity indicates that the user has exited. If the user activity indicates that the user has exited, the ODD_Service 122 destroys 516 the ODD_Object 120. The ODD_Stub is then cleared 518 from the touch-point 104. Following the clearing 518 of the ODD_Stub 104 from the touch point 104, the ODD_Service 122 again determines 520 if there has been a request from the touch-point 104 for an ODD_Object 120. If a request has been for an ODD_Object 120, the operation flow 600 returns to a point 522 before the location operation 506 and the location operation 506 is again performed. If it is determined 520 that a request has not been for an ODD_Object 120, the operation flow 600 is ended 524.

If a determination is made during the user exit determination operation 512 that a users action does not indicate that the user has exited, the ODD_Stub 104 passes 526 the event to the ODD_Object 120 and the ODD_Object 120 passes 528 the appropriate command(s) to the ODD_Stub 104. The ODD_Object 120 then executes 530 the appropriate business logic and updates 532 the ODD_Stub 532. Following the update 532 of the ODD_Stub 104, the operational flow 600 returns to a point 534 before the user action determination operation 512 location and the user action determination operation 512 is again performed.

As described above, the ODD_Object, ODD_Service, and ODD_Stub are preferably implemented as software modules. These software modules may be written in a number of different software languages. These software modules are preferably, though not necessarily, implemented in an object-oriented language. The following figures are class diagrams depicting the functions of and relationships among exemplary software modules. Generally, a class diagram models real-world entities and relationships among them. A class is a template defining the structure, elements, and behavior of software objects. The class diagrams illustrate exemplary interfaces through which the ODD_Object, the ODD_Service, and the ODD_Stub can communicate with one another. While the following embodiments are depicted in an object-oriented framework, it will be apparent to one skilled in the art how to implement the functions shown in the embodiments in a variety of object-oriented and non-object-oriented languages.

Figure 6:
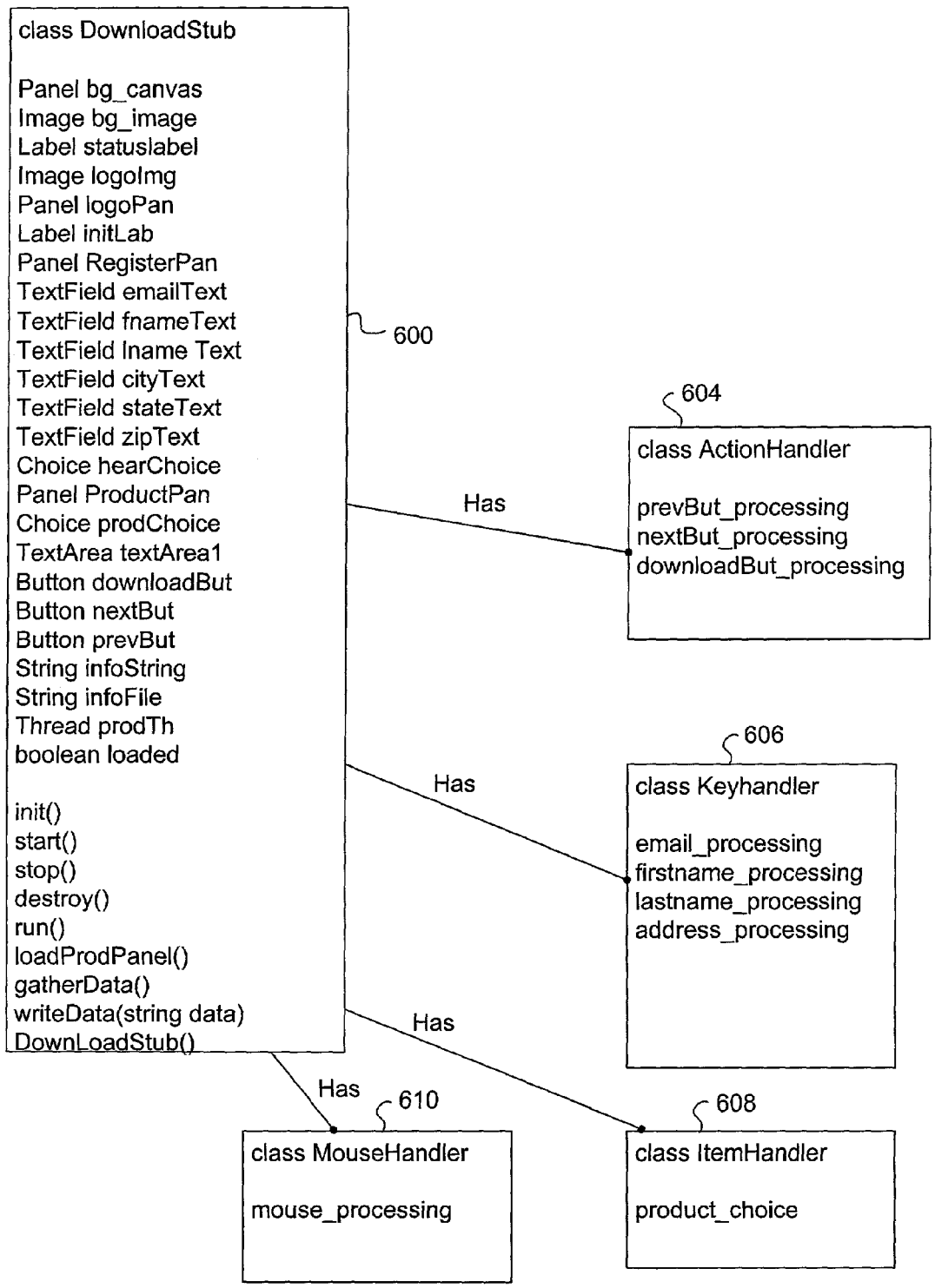
FIG. 6 is a class diagram depicting an exemplary data download system in an embodiment in accordance with the present invention.

FIG. 6 is a class diagram depicting an exemplary data download system in an embodiment in accordance with the present invention. The embodiment consists of a DownLoadObject class 600 that is operable to download any application specific data. For example, the DownLoadObject class 600 may define an interface to a stock price application delivering stock price data to a client. As another example, DownLoadObject class 600 may define an interface to a medical data application providing medical information to the client. The classes shown in FIG. 6 can be developed in any object-oriented software language, including, but not limited to C++, Smalltalk, Java, or Visual Basic. The behaviors and function described in the classes can also be implemented in software written in other procedural languages, such as, but not limited to, C, Fortran, or Pascal. Any corresponding compiler can be used to compile the source software written in accordance with the class diagrams of FIG. 6. Generally, source software is compiled to create a software file in a binary form, such as an ".obj" file. Different embodiments may include more than one file of source code. In those embodiments, a binary file will be created for each source code file. The binary files may be linked and located using any available linker and locator known in the art. The process of compiling, linking, and locating creates an executable ODD_Object that can be run on the server.

The executable ODD_Object is created and resides on the server. Using object-oriented terminology, the ODD_Service declares an instance of the ODD_Object in response to a request from a client. The ODD_Object is then registered with the ODD_Service process. The ODD_Object then begins running as a thread in the ODD_Service. As discussed earlier, the ODD_Service can be implemented as a daemon process on the server. After the ODD_Object is created, the ODD_Service may periodically call a task of the ODD_Object or the ODD_Service may call an ODD_Object task in response to events. If the ODD_Object is not implemented in object-oriented software, then the ODD_Service will typically call a function in the ODD_Object to start an ODD_Object task or function running.

After the ODD_Object is running on the server, it responds to events coming from the ODD_Stub residing on a touch-point device that is in operable communication with the server. As will be discussed in more detail, the ODD_Object performs a number of actions in response to events, including, but not limited to, sending application data and formatting presentation data. Application data generally refers to the content of the business application data. For example, application data in a medical data application may be a binary encoded representation of a patient X-ray. By contrast, presentation data is any data associated with how data is presented to the user. For example, presentation data may include the dimensions and position of an X-ray image presented on a display of the touch-point.

The touch-point can be any computerized system connected to the server via any network. For example, the touch-point may be a personal computer, a palm pilot, or a cellular telephone. Examples of a network include, but are not limited to, an intranet or Internet providing communications over an Ethernet or a telephone line. The network could also be a wireless network providing access to servers from a hand held wireless device. Events are logical representations of user events, such as mouse movements, keyboard or keypad data entry, or button clicks. Events are preferably binary encoded representations of user events. User events are captured or received by the ODD_Stub on the touch-point and encoded, formatted, and transmitted to the ODD_Object via the network. An event is preferably in a format that is quickly and efficiently communicated to and processed by the ODD_Object. Preferably, the ODD_Object provides an interface, such as an Application Programming Interface (API), and the event can be formatted in accordance with the interface.

In the software, when a particular variable of type DownLoadObject class 600 is declared, or instantiated, a DownLoadObject object is created. The DownLoadObject object is an example of an ODD_Object and is in operable communication with the ODD_Service and the ODD_Stub. The class description of DownLoadObject shows the internal variables and interface to the DownLoadObject. If the DownLoadObject is implemented in a procedural software language, the DownLoadObject will have an interface defined in a non-object-oriented fashion. In either case, the ODD_Stub which communicates with the DownLoadObject is specifically designed to interact with the DownLoadObject via the interface. The ODD_Stub is a client process residing on a touch-point connected to the server 108.

The DownLoadObject class 600 of FIG. 6 includes panel variables such as bg_canvas, logoPan, RegisterPan, and ProductPan. Panels are objects that provide methods for creating graphical panel components on the display of the touch-point. Panels can display textual information, or graphical information, and can have various sizes, and shapes. Panels can also provide data entry mechanisms to the user. As will be discussed, panels can have any or all of the other objects that are discussed here, such as labels, images, and buttons. Also in Download Castlet 600 are image variables, such as bg_image and logoImg. Image variable are objects that provide methods for creating images on the display of the touch-point. DownLoadObject class 600 also contains label variables, such as statuslabel and initLab, which are objects that provide methods for creating labels on the display of the touch-point. DownLoadObject class 600 also includes text objects, such as emailText, fnameText, lnameText, cityText, stateText, and zipText. Text objects provide methods for processing text that can be entered by a user at the touch-point.

The DownLoadObject class 600 includes choice objects, such as hearChoice, and ProductChoice. Choice objects provide methods for the user to input choices. For example, the hearChoice object is used to store information identifying where the user first heard of the site. The ProductChoice object can be used to enter and store information identifying the product that the user desires. Another object in the DownLoadObject class 600 is a text area object, such as textArea1, which can be used to accept textual input from the user. Button objects, such as downloadBut, nextBut, and prevBut are used to store and retrieve graphical button information. In the embodiment, there are three buttons presented to the user. Button nextBut is used to move to a next page, prevBut is used to move to a previous page, and downloadBut is used to download data from the network. Objects that encapsulate buttons have data that indicates button parameters and states, such as whether the button is pressed or not. As was discussed, the ODD_Stub running on the touch-point, sends event information regarding the status of the user interface. This status affects the state of objects in the DownLoadObject class. For example, if the user presses the next button, the object nextBut will be changed to a pressed state in response to a status message from the ODD_Stub running on the touch-point. When the nextBut changes to the pressed state, the DownLoadObject class 600 software can respond by providing a different screen interface to the user, comprised of graphical components such as panels, text areas, and buttons.

Other variables that can be included in the DownLoadObject class 600 are string variables, such as infoString and infoFile to handle string information, such as text input by the user, and file names. A thread object, such as prodTh, can be used to run a task, or thread of code. For example, one task for the DownLoadObject 600 is to wait until a request is received. The thread prodTh may start a wait task that waits until the request is received. The ODD_Service can be implemented on a multithreading system and can include reentrant software. Also in DownLoadObject class 600 there is a Boolean variable loaded that can be used to indicate whether the thread has been loaded. The objects and variables included in the DownLoadObject class 600 can be public, protected, or private in an object-oriented implementation.

The DownLoadObject class also includes methods, or functions, that provide an interface so that other classes can use the DownLoadObject class 600. The methods provided perform operations on the variables in the class. The methods include, but are not limited to, those shown in FIG. 6. An init method initializes the Download class object. A start method creates a new thread associated with the DownLoadObject class and starts running. A stop method stops the thread running. A destroy method removes the DownLoadObject object from memory. A run method is provided to respond to a request for an ODD_Stub. The run method calls a loadProdPanel method which displays to the user different ODD_Stubs available. A gatherData method gathers the text data that is input by the user and sent to the server, and combines the text elements (such as first name as last name) into a single string. A writeData method responds to an event from the ODD_Stub by locating a file containing the data and sending it to the ODD_Stub. A DownLoadObject method is a constructor that is run when an object of the class is instantiated.

The DownLoadObject class 600 can also use several classes to process user input and respond. In the embodiment of FIG. 6, the DownLoadObject class 600 uses an ActionHandler class 604 to process button actions. For example, the ActionHandler 604 queries an event from the touch-point to determine whether any of the buttons have been pushed. If the panel RegisterPan is currently displayed and the ActionHandler determines that the next button is pressed, the ActionHandler responds by sending a command commanding the ODD_Stub on the touch-point to display the product panel. The DownLoadObject class 600 can also use a KeyHandler class 606 for presenting prompts to the user for text input. The DownLoadObject class 600 can also use an ItemHandler class 608 for presenting the download button to the user. DownLoadObject class 600 can also use a MouseHandler class 610 for displaying messages to the user as the user moves the mouse pointer over areas of the display.

Table 1 contains java software that can be used to implement the class diagram shown in FIG. 6.

TABLE 1

```
public class DownLoadObject
{
    //Background Canvas
    CPanel bg_canvas;
    CImage bg_image;
    //Status
    CLabel statuslabel;
    //Logo
    CImage logoImg;
    CPanel logoPan;
    //Show the wait sign while castlet is loading the image
    CLabel initLab;
    //Register Panel .. register before you download
    CPanel RegisterPan;
    CTextField emailText;
    CTextField fnameText;
    CTextField lnameText;
```

TABLE 1-continued

```
CTextField streetText;
CTextField cityText;
CTextField stateText;
CTextField zipText;
CChoice hearChoice;
//Product Panel .. which product you want to download
CPanel ProductPan;
CChoice prodChoice;
CTextArea textAre61;
CButton downloadBut;
//Navigation
CButton nextBut;
CButton prevBut;
//Helpers
String infoString;
String infoFile;
Thread prodTh;
Boolean loaded;
//lock up the download registration file
static public final Object fileLock = new Object( );
public DownLoadObject( )
{
    super( );
    System.err.println("DownLoadObject: CREATED");
}
//init as in Applet
public void init( )
{
    System.err.println("DownLoadObject: INIT");
    //{{INIT_CONTROLS
    //--> The basic layout and background "canvas"
    setLayout(null);
    setSize(500,400);
    initLab = new CLabel("Distributing Castlet ...");
    initLab.setBounds(90,290,150,20);
    initLab.setFont(new CFont("Helvetica", CFont.BOLD, 14));
    initLab.setForeground(new Color(8421504));
    add(initLab);
    loaded = false;
}
//start as in Applet
public void start( )
{
    //Spawn a thread to load the gui
    //in the mean time, ask user to wait a little
    if (loaded == false) {
        prodTh = new Thread(this);
        prodTh.setPriority(Thread.MIN_PRIORITY);
        prodTh.start( );
        loaded = true;
    }
}
//Stop as in Applet
public void stop( )
{
    if(prodTh != null && prodTh.isAlive( )) {
        prodTh.stop( );
        prodTh = null;
    }
    System.err.println("DownLoadObject:STOP");
}
//destroy as in Applet
public void destroy( )
{
    System.err.println("DownLoadObject: DESTROY");
}
//Action Handler
class ActionHandler implements CActionListener
{
    public void actionPerformed(CActionEvent event)
    {
            Object object = event.getSource( );
            if (object== prevBut){
                ProductPan.hide( );
                RegisterPan.show( );
        }
    if (object == nextBut) {
        RegisterPan.hide( );
            ProductPan.show( );
```

TABLE 1-continued

```
        }
        if (object == downloadBut){
            writeData(gatherData( ));
            //Next redirect the user to the Web page containing the product
            showDocument("http://www.castlets.com/html/download.html");
            }
        }
    }
    class ItemHandler implements CItemListener
    {
        public void itemStateChanged(CItemEvent evt)
        {
            Object object = evt.getSource( );
            if(object == prodChoice){
                if (prodChoice.getSelectedItem( ).equals("CastWare v.06
with Docs")) {
                    textAre61.setText("The entire CastWare Java Packages.It
containsthe Castlet packages, the Castlet Manager, the Castlet Daemon, examples and
documentation");
                    downloadBut.show( );
                } else if (prodChoice.getSelectedIndex( ) == 2) {
                    textAre61.setText("The CastWare JavaPackages.It
contains the Castlet packages, the Castlet Manager, the Castlet Daemon and
examples");
                    downloadBut.show( );
                } else if (prodChoice.getSelectedIndex( ) == 0) {
                    textAre61.setText("");
                    downloadBut.hide( );
                }
            }
        }
    }
    class KeyHandler extends CKey Adapter
    {
        public void keyPressed(CKeyEvent evt)
        {
            Object object = evt.getSource( );
            if(object == emailText && evt.getKeyCode( ) == 10)
            {
                emailText.select(0,0);
                fnameText.selectAll( );
                fnameText.requestFocus( );
                statuslabel.setText("Please type in your first name");
            }
            if(object == fnameText && evt.getKeyCode( ) == 10)
            {
                fnameText.select(0,0);
                lnameText.selectAll( );
                lnameText.requestFocus( );
                statuslabel.setText("Please type in your last name");
            }
            if(object == lnameText && evt.getKeyCode( ) == 10)
            {
                lnameText.select(0,0);
                streetText.selectAll( );
                streetText.requestFocus( );
                statuslabel.setText("Please type in your street address");
            }
            if(object == streetText && evt.getKeyCode( ) == 10)
            {
                streetText.select(0,0);
                cityTextselectAll( );
                cityText.requestFocus( );
                statuslabel.setText("Please type in your city name");
            }
            if(object == cityText && evt.getKeyCode( ) == 10)
            {
                cityText.select(0,0);
                stateText.selectAll( );
                stateText.requestFocus( );
                statuslabel.setText("Please type in your state name");
            }
            if(object == stateText && evt.getKeyCode( ) == 10)
            {
                stateText.select(0,0);
                zipText.SelectAll( );
                zipText.requestFocus( );
                statuslabel.setText("Please type in your zip code");
            }
```

TABLE 1-continued

```
            if(object == zipText && evt.getKeyCode( ) == 10)
            {
                zipText.select(0,0);
                hearChoice.requestFocus( );
            }
        }
    }
    class MouseHandler extends CMouseAdapter
    {
        public void mouseEntered(CMouseEvent evt)
        {
            Object object = evt.getSource( );
            if(object == logoPan){
                statuslabel.setText("Castlets by Tian");
            }
        }
        public void mouseExited(CMouseEvent evt)
        {
            Object object = evt.getSource( );
            if(object == logoPan){
                statuslabel.setText("");
            }
        }
    }
    public void run( )
    {
        loadProdPanel( );
        remove(initLab);
        emailText.selectAll( );
        emailText.requestFocus( );
    }
    public void loadProdPanel( )
    {
        try {
            bg_image =
getImage(getCodeBase( ),"examples/download/download_bg.gif");
            logoImg =
getImage(getCodeBase( ),"examples/download/clog_0.gif");
        } catch (Exception e) {
            System.err.println(e);
        }
        bg_canvas = new ImagePanel(bg_image);
        bg_canvas.setLayout(null);
        bg_canvas.setBounds(0,0,450,289);
        // -> Logo, Status Bars and other general controls
        logoPan = new ImagePanel(logoImg);
        logoPan.setBounds(5,289,30,30);
        add(logoPan);
        statuslabel = newCLabel("");
        statuslabel.setBounds(47,289,278,20);
        statuslabel.setFont( new CFont("Courier", CFont.PLAIN, 10));
        // -> The Register Panel and its associated CWTs
        RegisterPan = new Cpanel( );
        RegisterPan.setLayout(null);
        RegisterPan.setBounds(92,52,198,160);
        bg_canvas.add(RegisterPan);
        RegisterPan.setBackground(Color.black);
        emailText =new CTextField("Please type your e-mail address");
        emailText.setBounds(8,9,179,19);
        emailText.setFont(new CFont("Helvetica", CFont.ITALIC, 10));
        emailText.setForeground(Color.white);
        RegisterPan.add(emailText);
        fnameText = new CTextField("Please type your first name");
        fnameText.setFont(new CFont("Helvetica", CFont.ITALIC, 10));
        fnameText.setForeground(Color.white);
        RegisterPan.add(fnameText);
        fnameText.setBounds(8,34,179,19);
        lnameText = new CTextField("Please type your last name");
        lnameText.setBounds(8,59,179,19);
        lnameText.setFont(new CFont("Helvetica", CFont.ITALIC, 10));
        lnameText.setForeground(Color.white);
        RegisterPan.add(lnameText);
        streetText = new CTextField("Please type your street address");
        streetText.setBounds(8,84,179,19);
        streetText.setFont(new CFont("Helvetica", CFont.ITALIC, 10));
        streetText.setForeground(Color.white);
        RegisterPan.add(streetText);
        cityText = new CTextField("City");
        cityText.setBounds(8,109,78,19);
```

TABLE 1-continued

```
        cityText.setFont(new CFont("Helvetica", CFont.ITALIC, 10));
        cityText.setForeground(Color.white);
        RegisterPan.add(cityText);
        stateText = new CTextField("st");
        stateText.setBounds(89,109,26,19);
        stateText.setFont(new CFont("Helvetica", CFont.ITALIC, 10));
        stateText.setForeground(Color.white);
        RegisterPan.add(stateText);
        zipText = new CTextField("zip");
        zipText.setBounds(118,109,68,19);
        zipText.setFont(new CFont("Helvetica", CFont.ITALIC, 10));
        zipText.setForeground(Color.white);
        RegisterPan.add(zipText);
        hearChoice = new CChoice( );
        hearChoice.addItem("Learned about Castlets from ...");
        hearChoice.addItem("Internet");
        hearChoice.addItem("Advertising ");
        hearChoice.addItem("Browsing");
        hearChoice.addItem("Searching");
        hearChoice.addItem("Other");
        RegisterPan.add(hearChoice);
        hearChoice.setBounds(8,135,179,15);
        hearChoice.setFont(new CFont("Helvetica", CFont.ITALIC, 10));
        hearChoice.setForeground(Color.white);
        hearChoice.setBackground(Color.black);
        // -> The Product Panel
        ProductPan = new Cpanel( );
        ProductPan.hide( );
        ProductPan.setLayout(null);
        ProductPan.setBounds(92,52,198,160);
        ProductPan.setBackground(Color.black);
        bg_canvas.add(ProductPan);
        prodChoice = new CChoice( );
        prodChoice.addItem("Please select a product ");
        prodChoice.addItem("CastWare v.06 with Docs");
        prodChoice.addItem("CastWare v.06 without Docs ");
        prodChoice.setForeground(Color.white);
        prodChoice.setBounds(8,9,179,15);
        prodChoice.setFont(new CFont("Dialog", CFont.ITALIC, 10));
        prodChoice.setForeground(Color.white);
        prodChoice.setBackground(Color.black);
        ProductPan.add(prodChoice);
        textAre61 = new
CTextArea("",0,0,CTextArea.SCROLLBARS_NONE);
        textAre61.setFont(new CFont("Helvetica", CFont.PLAIN, 10));
        textAre61.setEditable(false);
        textAre61.setForeground(Color.white);
        ProductPan.add(textAre61);
        textAre61.setBounds(8,37,179,78);
        downloadBut = new CButton("Submit");
        downloadBut.setActionCommand("download");
        downloadBut.setBounds(66,126,70,22);
        downloadBut.setForeground(Color.white);
        downloadBut.setBackground(Color.black);
        ProductPan.add(downloadBut);
        downloadBut.hide( );
        prevBut = new CButton("<<");
        prevBut.setActionCommand("prev");
        prevBut.setFont(new CFont("Dialog", CFont.BOLD, 12));
        prevBut.setBounds(162,230,25,22);
        prevBut.setForeground(Color.white);
        prevBut.setBackground(Color.black);
        bg_canvas.add(prevBut);
        prevBut.setEnabled(true);
        nextBut = new CButton(">>");
        nextBut.setActionCommand("next");
        nextBut.setFont(new CFont("Dialog", CFont.BOLD, 12));
        nextBut.setBounds(197,230,25,22);
        nextBut.setForeground(Color.white);
        nextBut.setBackground(Color.black);
        bg_canvas.add(nextBut);
        nextBut.setEnabled(true);
        add(bg_canvas);
        add(statuslabel);
        //add event listener
        ActionHandler acth = new ActionHandler( );
prevBut.addActionListener(acth);
        nextBut.addActionListener(acth);
        downloadBut.addActionListener(acth);
```

TABLE 1-continued

```
        ItemHandler itemh = new ItemHandler( );
        prodChoice.addItemListener(itemh);
        KeyHandler keyh = new KeyHandler( );
        emailText.addKeyListener(keyh);
        fnameText.addKeyListener(keyh);
        lnameText.addKeyListener(keyh);
        streetText.addKeyListener(keyh);
        cityText.addKeyListener(keyh);
        stateText.addKeyListener(keyh);
        zipText.addKeyListener(keyh);
        MouseHandler mouseh = new MouseHandler( );
        logoPan.addMouseListener(mouseh);
    }
    String gatherData( ) {
        // Customize gatherData based on your specific UI
        return     new String( "\'" + emailText.getText( ) + "\"" + "," +
                        "\'" + fnameText.getText( ) + "\"" + "," +
                        "\'" + lnameText.getText( ) + "\"" + "," +
                        "\'" + streetText.getText( ) + "\"" + "," +
                        "\'" + cityText.getText( ) + "\"" + "," +
                        "\'" + stateText.getText( ) + "\"" + "," +
                        "\'" + zipText.getText( ) + "\"" + "," +
                        "\'" + hearChoice.getSelectedItem( ) +
"\"" + "," +
                        "\'" + prodChoice.getSelectedItem( ) +
"\"" );
    }
    void writeData(String data) {
        synchronized(fileLock)
        {
            try {
                File Writer fout = new
File Writer(getCodeBase( ).getFile( )+"examples/download/custinfo.dat", true);
                fout.write(data+"\n",0,data.length( )+1);
                fout.flush( );
                fout.close( );
            } catch (IOException e) {
                e.printStackTrace( );
            }
        }
    }
}
//Helper Classes
class ImagePanel extends CPanel {
    CImage img;
    public ImagePanel(CImage img)
    {
        this.img=img;
    }
    public void paint(CGraphics eg)
    {
        cg.drawImage(img,0,0,this);
    }
}
```

The embodiment of FIG. 6 and the corresponding software in Table 1 illustrate a method and system implementing on-demand distribution of software that allows a touch-point to interface with any server, regardless of the communications protocol used. A more complex ODD_Stub can allow a Web site to present download/register capabilities for various application specific content. The software above demonstrates the use of unicast ODD_Stubs to present business logic through a presentation logic that is distributed on-demand by the ODD_Object. Unicast refers to point-to-point transmission of data between one ODD_Object and one ODD_Stub. Another embodiment in accordance with the present invention allows for broadcast transmission. In the broadcast transmission embodiment, an ODD_Object communicates with all of the ODD_Stubs on a network. Another embodiment is a multicast transmission scheme, in which an ODD_Object communicates with many ODD_Stubs on a network.

Figure 7:
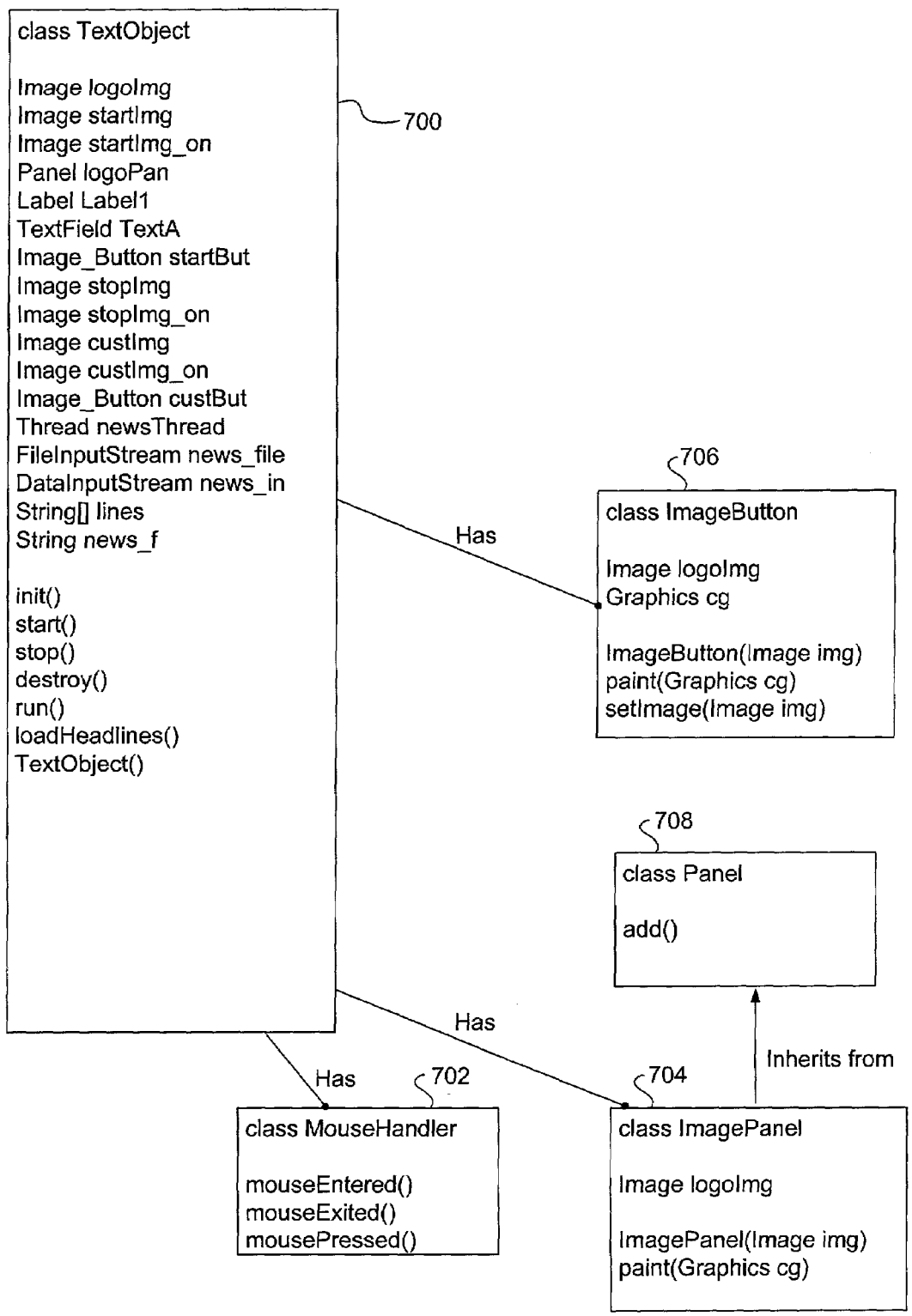
FIG. 7 illustrates a class diagram depicting another exemplary ODD_Object in accordance with an embodiment of the present invention.

FIG. 7 illustrates a class diagram depicting another exemplary ODD_Object in accordance with an embodiment of the present invention. The ODD_Service runs as a process on a server, and the ODD_Object is a part of the ODD_Service process. The ODD_Object can be viewed as a thread in the ODD_Service process. As will be discussed in more detail, the ODD_Object provides an interface to the ODD_Service through which the ODD_Service can communicate to the ODD_Object. The ODD_Object in the embodiment of FIG. 7 illustrates a design of a headline news application server on the server. The ODD_Object includes a text object class 700 containing variables and methods for interacting with an ODD_Stub communicating to the server over a network. The text object class 700 includes one or more variables, or objects, storing image information, such as logoImg, startImg, stratImg_on, stopImg, stopImg_on, custImg, and custImg_on. The variable logoImg may contain a pointer to an image of a corporate logo. The other images are used for various parts of the presentation at various times during the user's interaction with the headline news application.

Also included in the text object class 700 are one or more label objects, such as Label1. Labels can be used to present messages to the user in response to certain events, such as mouse movements. One or more text field objects, such as TextA, are used by the text object class 700, to render text input regions on the presentation display. The object TextA can store information about a text entry region such as the region's size and location. Similarly, one or more button objects, such as startBut and custBut, manage the presentation of buttons to the user. Presentation logic in a button object includes but is not limited to setting the location, size, and color of the button. One or more panel objects, such as logo-Pan, are included in the text object class 700 to manage the presentation of panels to the user. Panels are preferably graphical presentation regions on the display having buttons, text entry regions, and images. The user can interact with the headline news application through the interface presented by the panel. User events, such as mouse movements, and button clicks, are communicated to the text object 700. The text object 700 responds to the events by setting parameters for buttons, images, text fields, and panels to adjust the appearance of the presentation to the user when necessary.

A thread object, such as newsThread, handles news headline task management. Tasks managed by the newsThread include, but are not limited to, waiting for the user to request news, gathering news data from a file, formatting the news data, and sending the news data to the touch-point. A file input stream, such as news_file, can be an object managing file input. For example, the news_file object may hold a pointer to a news file, and have methods for opening the file, reading from the file, and closing the file. The news_file object may also deliver status messages, such as error messages when a file is not located or cannot be opened. A data input stream, such as news_in, can be an object that manages text data. For example, news_in may have a pointer to a data buffer, as well as methods for reading lines of text from the data buffer, parsing text data, and writing text data to the buffer. String variables, such as lines and news_f may be included in the text object class 700 to identify lines of news data, sequence through the lines, and retrieve the lines of news so that the headline news can be presented to the user.

The text object class 700 includes one or more methods that provide an interface for the ODD_Service, and other objects, or applications that can communicate to, and use the ODD_Object. As discussed earlier, the ODD_Service can be implemented as a daemon that can manage one or more ODD_Objects. Management of an ODD_Object includes starting and stopping the ODD_Object. While the ODD_Object is running, the ODD_service may communicate with the ODD_Object using any of a number of interfaces. In one embodiment, the interface to the ODD_Object can be an application programming interface (API), whereby the ODD_Service makes API calls to the ODD_Object. In another embodiment, the ODD_Service and the ODD_Object can communicate through a message queue server. In still a further embodiment, the ODD_Service and the ODD_Object can communicate using inter process communication. When the ODD_Service receives an event from the ODD_Stub via the network, the ODD_Service communicates the event to the ODD_ Object through whatever interface is used.

The interface to the text ODD_Object in FIG. 7 is comprised of the methods shown in the text object class 700. An init method is provided to initialize the variables included in the text object class 700. For example, the init method may initialize the boundaries and size of a button on a starting panel. A start method is provided to a news task running. A stop method is provided to terminate a running news task. A destroy method may be called to stop processing by the text object class 700 and remove it from memory. A run method can be used to start the headline news processing, such as gathering headline news from a file, formatting the news, and sending it to the touch-point. A method called loadHeadlines can be provided to encapsulate the functionality of gathering headline news data from a file and loading it into a data stream that can be sent to the ODD_Stub for presentation at the touch-point. The text object class 700 includes a TextObject method, which is the constructor that is run whenever the text object class 700 is instantiated in a declaration. The TextObject method can perform any function necessary at the time of instantiation, including variable and status initialization.

The ODD_Object can include other classes to encapsulate certain functionality. These classes may be used by the text object class 700 to facilitate presentation of data to the user. These classes include, but are not limited to, a MouseHandler class 702, an ImagePanel class 704, and an ImageButton class 706. The MouseHandler class 702 provides functions similar to those of MouseHandler class 610 of FIG. 6. The ImagePanel class 704 provides functions to manipulate an image panel on the display of the touch-point. An image panel is a specialized panel having an image associated with it. The image can be displayed on the panel as a background to the buttons, and other graphical components on the panel. The ImagePanel class 704 may store an image, such as logoImg. Alternatively, the ImagePanel class 704 may store a pointer to an image in memory. The ImagePanel class 704 has one or more methods that provide an interface to manipulate the image panel. Methods of the ImagePanel class 704 include the constructor, ImagePanel, and a paint method. The constructor preferably performs any necessary image panel initialization, such as setting logoImg equal to an initial image. The paint method may cause the image panel to be rendered on the display. The ImagePanel class 704 can inherit from a more basic Panel class 708. The Panel class 708 can have a function, such as add, which allows a user of Panel to add a graphical component to the Panel.

The ImageButton class 706 provides an interface to manipulate graphical buttons on the display. An image button can be viewed as a specialized button, which has an image associated with the button. The ImageButton class includes an Image object, such as logoImg. The ImageButton class also includes a Graphics variable, such as cg, which is used to present graphics to the user. The ImageButton class 706 provides an interface consisting of one or more methods. The constructor, ImageButton, typically performs initialization functions, such as initializing logoImg to an image in memory. A paint method causes the graphics element cg to be rendered on the display at the touch-point. A setImage method allows a user of the ImageButton class 606 to set logoImg equal to an image in memory.

The functionality shown in the class diagram of FIG. 7 can be implemented in any software language. While the class diagrams are well-suited for implementation using an object-oriented language, such as Smalltalk, Java, or C++, one skilled in the art will recognize that the functionality described in the class diagrams can easily be implemented in other languages, such as C, Pascal, or Fortran. The following are based on Java software, for example the abstract window toolkit (AWT) and Java foundation classes (JFC), elements that can implement the classes shown in FIG. 7. The software can be extended from the basic AWT and JFC classes to form customized application classes.

TABLE 2

```
public class TextObject
{
// Declare graphical components
CTextField textA;
Clabel label1;
CImage logoImg;
CPanel logoPan;
CImage startImg;
CImage startImg_on;
ImageButton startBut;
//...
// Declare other variables that are used for the Business logic
Thread newsThread;
        FileInputStream news_file;
        DataInputStream news_in;
        //...
        String[ ] lines;
        String news_f;
        public void init( )
        {
// Set properties for each graphical component
        textA = new CTextField("Coding like hell?");
                textA.setEditable(false);
                textA.setBounds(10,15,218,24);
                textA.setBackground(Color.red);
                textA.setForeground(Color.white);
            textA.setFont(new CFont("Helvetica", CFont.PLAIN, 10));
                textA.setCursor(new
Cursor(Cursor.DEFAULT_CURSOR));
                textA.disableOldEvents( );
                add(textA);
// Business logic
        // Set the news.txt file stream
                try {
                        news_file = new FileInputStream(news_f);
                        news_in = new DataInputStream(news_file);
                        loadHeadlines( );
                } catch (IOException e) {
                        System.out.println(e);
                }
        //...
        }
        public void stop( )
        {
                if(newsThread!=null&&newsThread.isAlive( ))
                        newsThread.stop( );
                running = false;
                System.err.println("stop");
        }
// Tie the presentation to business logic
        class MouseHandler extends CMouseAdapter
        {
                public void mouseEntered(CMouseEvent evt)
                {
                        Object object = evt.getSource( );
                        if(object == logoPan){
                            label1.setText("Castlets by Tian");
                            return;
                        }
                        if(object == custBut)
                        {
                            custBut.setImage(custImg_on);
                            label1.setText("Customize me!");
                            return;
                        }
                }
                public void mouseExited(CMouseEvent evt)
                {
                        Object object = evt.getSource( );
                        if(object == logoPan){
                            label1.setText("");
                            return;
                        }
                        if(object == startBut){
                            if(running){
                                startBut.setImage(startImg_on);
                            } else {
                                startBut.setImage(stopImg_on);
                        }
```

TABLE 2-continued

```
                        label1.setText(""));
                        return;
                    }
                }
                //...
            }
            //...
// Set the text field text to the actual news:
            // Run method for our news thread
            public void run( )
            {
                try
                {
                    while(true)
                    {
                        Thread.currentThread( ).yield( );
            Thread.currentThread( ).sleep(delay);
                        if (i <= num_lines−1) {
                            textA.setText(lines[i]);
                            i++
                        }
                        else i = 0;
                    }
                } catch (Exception e)
                {
                    System.out.println(e);
                }
            }
// More business logic implementation:
            // A helper method that allows us to
            // read all the headlines in an array of Strings
            // Format for the news files is simply:
            // First line:a number that matches the total news
lines
            // All subsequent lines - the actual news
            void loadHeadlines( )
                throws IOException
            {
                num_lines =
Integer.parseInt(news_in.readLine( ));
                lines = new String[num_lines];
                for (int i = 0; i < lines.length; i++)
                    lines[i] = news_in.readLine( );
            }
// Create a custom, rollover push button and an image panel:
            class ImagePanel extends CPanel {
                CImage logoImg;
                public ImagePanel(CImage img)
                {
                    logoImg=img
                }
                public void paint(CGraphics eg)
                {
                    cg.drawImage(logoImg,0,0,this);
                }
            }
            class ImageButton extends CCanvas {
                CImage img;
                CGraphics cg;
                public ImageButton(CImage img)
                {
                    this.img=img
                }
                public void paint(CGraphics eg)
                {
                    cg.drawImage(img,0,0,this);
                }
    public void setImage(CImage img)
            {
                this.img = img;
                if (cg == null) cg = getGraphics( );
                paint(cg);
            }
}
```

Once compiled, the above ODD_Object can be registered with the ODD_Service. The ODD_Object is registered with the ODD_Service so that the ODD_Object is a part of the process running on the server. After the ODD_Object is registered, it will receive events and receive processor time to process the events and respond to them. Registering the ODD_Object can include notifying the ODD_Service of identification parameters of the ODD_Object. Such identification parameters can include, but is not limited to, a name for the ODD_Object and a memory location for the ODD_Object.

In one embodiment, all business logic, graphical user interface (GUI) layout management (also referred to as the presentation logic), and event handling is embedded in the ODD_ Object on the server. The ODD_Stub in this embodiment presents the GUI to the user on the display and relays events to the ODD_Object running on the server. Events include, but are not limited to, text entry, mouse w movement, and button pressing.

In an alternative embodiment, the ODD_Stub handles responding to certain events, certain GUI changes, and interactions with the touch-point. For example, when the user presses a button, the ODD_Stub could render the button with a depressed look, or a different color without sending the button press event to the ODD_Object on the server. This embodiment is useful for events that are not coupled tightly with the business logic. This embodiment may improve the performance because time is saved by not sending all events to the server, having the server process the events, and communicate back the proper response. When the ODD_Stub handles events, GUI changes, and touch-point interaction locally at the touch-point, this is referred to as localization. Localization can be done at the graphical component level whereby the graphical component handles its default drawing, layout, and presentation management.

Different developers may localize ODD_Stubs in different ways. In other words, one developer may choose certain presentation management functions to be implemented on the ODD_Stub, while another developer may want those presentation management functions to be performed by the ODD_Object at the server. Two general embodiments for localizing the stub in accordance with the invention, are a subclass embodiment and an aggregation embodiment.

Figure 8:
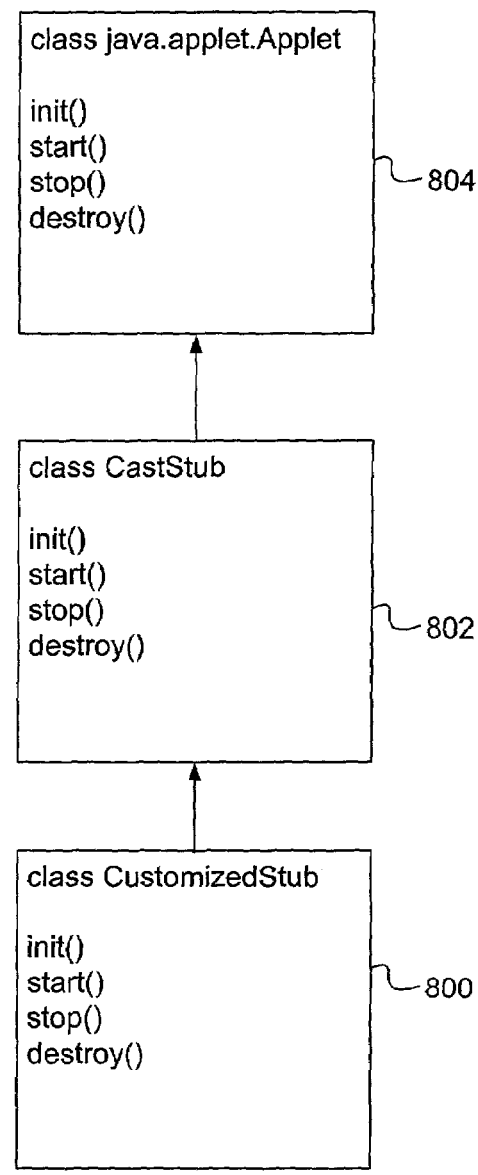
FIG. 8 illustrates localization of the stub in accordance with an embodiment of the present invention.

One embodiment of the subclass method of localizing the stub is shown in FIG. 8. As can be seen in FIG. 8, there is an inheritance relationship among several classes. A CustomizedStub class 800 inherits from a CastStub class 802, which inherits from a java applet class 804. In object-oriented terminology, the CustomizedStub class 800 is a subclass of the CastStub class 802, which is a subclass of the java applet class 804. Each class has one or more methods, or functions, which provide an interface to the class. For example, the CustomizedStub class 800 includes four methods: init, start, stop, and destroy. Likewise, the CastStub class 802 and the java applet class 804 each include init, start, stop, and destroy methods. The subclass overrides one or more of the functions of the parent class. For example, the CustomizedStub class 800 may override the init function of the CastStub class 802 by adding an additional button to the display. In operation, all the init functions are called. Thus, the developer can layer additional presentation management functionality in functions at each subclass level. The functions at the most basic class level, in the java applet class 804, manage the lowest level communications to the network. Functions in the java applet 804, manage the server proxy interface to the touch-point.

Stated differently, developers subclass the Java applet class 804 and the CastStub class 802 to derive the CustomizedStub class 800. CustomizedStub class 800 class has its own GUI components and its own logic. The ODD_Stub comprises the java applet class 804, the CastStub class 802, and the CustomizedStub class 800. The ODD_Stub has two parts: a client part and a server proxy part. The client part processes local events and manages local presentation. The server proxy part manages input and output of data from and to the network. Both parts works on the same user interface but they do not interfere with each other because presentation logic is split between the ODD_Stub and the ODD_Object.

Figure 9:
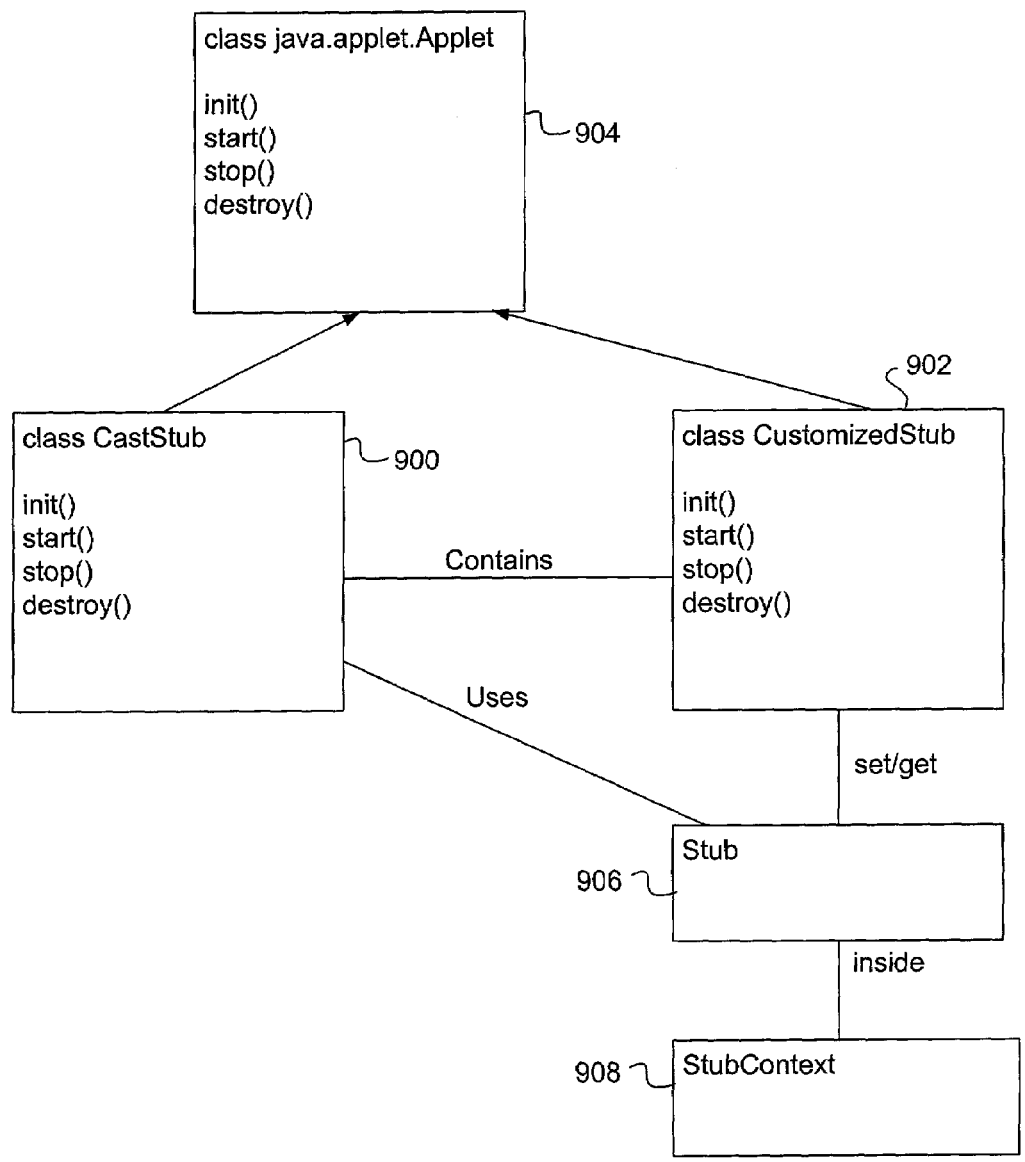
FIG. 9 illustrates aggregation of the stub in accordance with an embodiment of the present invention.

FIG. 9 illustrates aggregation of the stub in accordance with an embodiment of the present invention. In the embodiment of FIG. 9, a CastStub class 900 can be a component inside a container, such as CustomizedStub 902. The CustomizedStub 902 and its components are local to the client. The CastStub 900 can be an applet and the CustomizedStub 902 can be an applet container. As an applet container, the CustomizedStub 902 provides an applet context and invokes the mit, start, stop, and destroy functions at the appropriate times. The CustomizedStub 902 also passes events to the CastStub 900. The CustomizedStub 902 and the CastStub 900 inherit a Java applet class 904, which provides functions for interfacing with the network, such as formatting data, and performing communication timing and protocol activities. A stub module 906 formats data according to the protocol used by the touch-point. A stub context module 908 provides a context for the stub, such as a location in memory, device type, data content, and data formatting rules. The stub module 906 formats data for display according to the protocol employed by the touch-point. For example, if the touch-point displays java, the stub module 906 would be a java applet. As another example, if the touch-point displays html language, the stub module 906 would be an html stub converting data received from the network into html markup language. Other possible stub types include XML, WML and SGML.

Table 3 illustrates exemplary software in an ODD_Object that can be used to print a simple message to the touch-point display. The message is displayed at a position on the display and has a font size.

TABLE 3

Class HelloWorld extends ODD_Object
{
    showText("hello world", position, fontsize);
}

The message with position and font size information is communicated over the network to the ODD_Stub.

Table 4 illustrates exemplary software that could be used to implement a java applet stub module 906 of FIG. 9.

TABLE 4

TextArea ta = new TextArea(position);
ta.setFont(fontsize);
ta.setText("hello world");

As another example of a particular implementation, Table 5 illustrates a line of software that could be used to implement an html stub.

TABLE 5 document.write("<h1> hello world <h1>");

For security purposes, computing entities, such as computers, servers, and web sites, communicating over a network, utilize firewalls. A firewall is a network component including hardware and software, that filters unwanted data to protect the computing entities from harmful or potentially damaging data. Filtering is based on certain criteria and allows only trusted data to enter the computer entity. A common firewall configuration is to block all network data except for the well-known services. As a result, firewalls frequently will filter data that is not in a Hypertext Markup Language (HTML) format. An embodiment of the invention implements HTTP tunneling to avoid filtering of a proprietary protocol. HTTP tunneling refers to a method and system for embedding proprietarily formatted data into an HTML file and communicating the HTML file using the well-known HTTP protocol so that the proprietary data can be communicated through a firewall.

Figure 10:
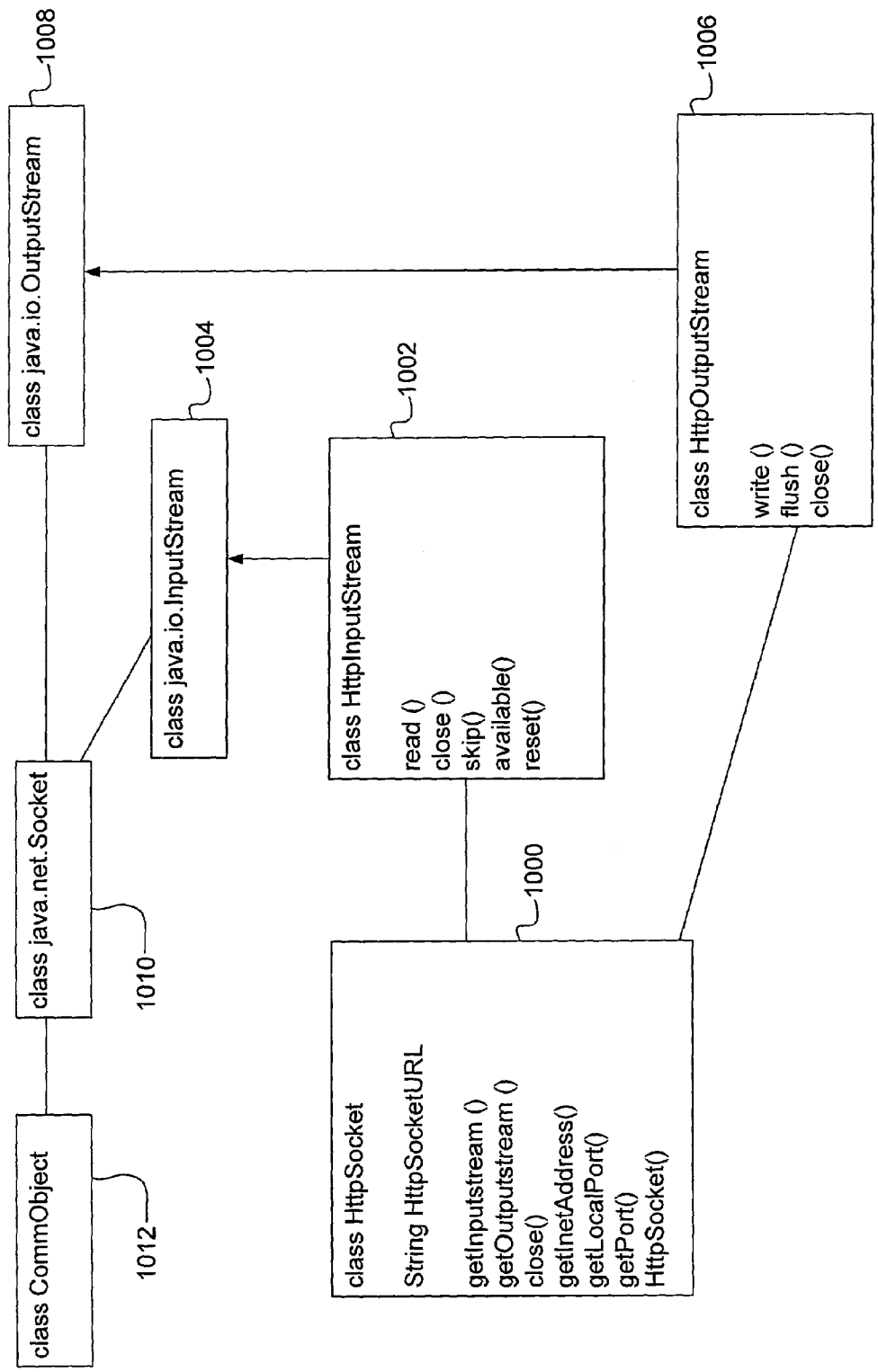
FIG. 10 is a class diagram illustrating HTTP tunneling software modules in accordance with an embodiment of the present invention.

FIG. 10 is a class diagram illustrating HTTP tunneling software modules in accordance with an embodiment of the present invention. An HTTP socket class 1000 is an abstraction of an HTTP socket that can communicate through firewalls. The HTTP socket class 1000 extends the Java socket so that the HTTPSocket class 1000 can facilitate communication between computing entities across firewalls. In the HTTPSocket class 1000, a string variable HttpSocketURL designates a Uniform Resource Locator (URL) address for communication. A getInputstram method is provided in the HTTP Socket class 1000 to create and input stream for this socket. A getOutputstram method is provided in the HTTP Socket class 1000 to create and output stream for this socket. A stream is a contiguous group of data for input or output. A close method can be used to close the socket. Closing the socket may include terminating communications with the socket. A getInetAddress method retrieves the remote Internet Protocol (IP) address to which this socket is connected. A get LocalAddress method retrieves the IP address of this socket. A getLocalPort method is provided to retrieve this socket's local port. A getPort method is used to retrieve this socket's remote port. A constructor method, HttpSocket, is provided that runs at the time a variable of this class type is declared. It should be recognized that the methods and variables included in the classes described herein are exemplary only and each class may have more or fewer than those illustrated.

Table 6 contains exemplary C++ software that implements an example of how an HttpSocket class 1000 may be used to communicate to a server.

TABLE 6

```
public class client_example
{
    public static void main(String args[ ])
    {
        //New a httpsocket
        HttpSocket client = new HttpSocket("yourhost", 1900);
        DataOutputStream dout= new
DataOutputStream(client.getOutputStream( ));
        DataInputStream din = new
DataInputStream(client.getInputStream( ));
        //Write and read
        dout.writeUTF("Hello, this is a test of tunneling");
        String ret = din.readUTF( );
        System.err.println(ret);
        client.close( );
    }
}
//Simple echo server
public class server_example
{
    public static void main(String args[ ])
    {
        ServerSocket server = new ServerSocket(1900);
        While(true)
```

TABLE 6-continued

```
        {
            Socket ssocket= server.accetp( );
            DataInputStream din= new
DataInputStream(ssocket.getInputStream( ));
            DataOutputStream dout=new
DataOutputStream(ssocket.getOutputStream( ));
            //echo
            String s = din.readUTF( );
            sout.writeUTF(s); /
            ssocket.close( );
        }
    }
}
```

Continuing with FIG. 10, an HttpInputStream class 1002, encapsulates data stream input functionality. Using the HttpInputStream 1002, data can be read and/or manipulated in a variety of ways. Exemplary methods for the HttpInputStream 1002 include a read method, a close method, a skip method, an available method, and a reset method. The read method reads data from an input stream. The read method can be implemented to read a designated number of bytes of data when the method is called. The skip method skips a designated number of bytes of data. The available method determines the number of bytes that can be read without being blocked. The close method closes the input stream. The reset method resets the current read position to a designated position within the stream. The HttpInputStream 1002 inherits from a java InputStream module 1004. The java InputStream module 1002 provides lower level functions for retrieving a stream of input data from a java Socket module 1004.

An HttpOutputStream class 1006, encapsulates data stream output functionality. Using the HttpOutputStream 1006, data can be written to the java Socket 1004. Exemplary methods for the HttpOutputStream 1006 include a write method, a close method, and a flush method. The write method can accept parameters such as an integer indicating how many bytes of data to write. The write method can format data into HTML format for tunneling data in a proprietary format so that the data can be communicated through a firewall. The write method can be viewed as converting data in one format to an HTML format to facilitate tunneling. The flush method removes any buffered bytes from the output stream. The close method closes the output stream. The HttpOutputStream 1002 inherits from a java OutputStream module 1008. The java OutputStream module 1008 provides lower level functions for writing a stream of output data to the java Socket module 1010. The java Socket module 1010 is an abstraction of a socket and facilitates transmitting and receiving java or HTML data through the socket to and from the network. For example, the java Socket module 1010 may handle a communications protocol when communicating data to the network. The java Socket module may also use a CommObject 1012 to interface with the network. The ComObject 1012 may provide lower level functions handling protocol and transmission issues, such as timing of transmissions and packet reception.

It should be apparent to the reader that any methods and variables described in relation to classes described herein are only exemplary for the described embodiments. Alternative embodiments may employ more or fewer methods and variables to carry out the functions described herein. Furthermore, as has been mentioned, the functionality described in the embodiments need not be implemented in any particular software language. The software language may be one of many known object-oriented languages, or procedural languages. One skilled in the art will recognize how to convert the object-oriented abstractions described above into procedural abstractions to carry out the functions described.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

In conclusion, the ODD_Service provides a much simpler way than in prior approaches to develop distributed applications for networked systems such as the Internet or the World Wide Web (WWW). Since there is no need to code the low-level communication mechanisms, or worry about issues such as memory management and server side programming, the on-demand distribution (ODD) mechanism allows for highly-distributable objects to be partitioned into clients and servers at run-time and on demand. By using the ODD_Service, client and servers are created on demand, with all of the communication protocols, business logic, and presentation logic managed by the service and intelligently mapped to client/servers, peer-to-peer, thin clients or other networked architectures and platforms.

We claim:

1. In a communications network environment having a plurality of touch-points and a plurality of objects, a computer-implemented method of establishing communication, the method comprising the steps of:
    receiving a request from a first touch-point having predetermined attributes for a stub operable to communicate with a first object, wherein the stub is configured to format and transmit user events to the first object and respond to commands from the first object, the user events comprising user interactions with the first touch-point;
    delivering the stub to the first touch-point, wherein the stub is selected based on compatibility with the first touch-point and on a correspondence between the stub and the first object, wherein the compatibility with the first touch-point is based at least in part on the predetermined attributes of the first touch-point;
    selecting the first object from a plurality of objects, each of the plurality of objects being associated with a respective type of touch-point and the first object being associated with the first touch-point; and
    initializing the first object such that communication between the first object and the touch-point is established.

2. The method of claim 1, wherein the user events are selected from the group consisting of mouse movements, keyboard entries, keypad entries, and button clicks.

3. In a communications network environment having a touch-point including a stub and having a plurality of objects including at least a first object associated with the stub, a computer-implemented method of establishing communication between the stub and the first object comprising the steps of:
    requesting the first object;
    locating the first object from among the plurality of objects, each of the plurality of objects being associated with a respective type of touch-point having predetermined attributes and the first object being associated with the first touch-point;
    receiving the stub at the touch-point, wherein the stub is selected based on compatibility with the touch-point and on a correspondence between the stub and the first object, wherein the compatibility with the touch-point is based at least in part on the predetermined attributes of the touch-point, and wherein the stub is configured to format and transmit user events to the first object and respond to commands from the first object, the user events comprising user interactions with the touch-point; and
    initializing the first object such that communication between the first object and the stub is established, thereby allowing the first object to provide data to the stub that is compatible with the touch-point.

4. The computer-implemented method of claim 3, wherein the user events are selected from the group consisting of mouse movements, keyboard entries, keypad entries, and button clicks.

5. A computer storage medium having stored thereon computer executable instructions for communicating with a plurality of touch-points, the plurality of touch-points including a first type touch-point, the first type touch-point sending an object request, the computer executable instructions comprising:
    a plurality of objects associated with a respective type of touch-point and including a first object associated with the first type touch-point having predetermined attributes and configured to communicate with the first type touch-point upon initialization of the first object; and
    a service module that receives the object request from the first type touch-point and, in response to the receipt of the object request, locates the first object and initializes the first object, wherein the service module is configured to select a stub based at least in part on the predetermined attributes of the first type touch-point and to deliver the stub to the first type touch-point that is configured for operating with the first type touch-point and corresponds to the first object, and wherein the stub is configured to format and transmit user events to the first object and respond to commands from the first object, the user events comprising user interactions with the first type touch-point.

6. The computer storage medium of claim 5 wherein the stub comprises computer-executable instructions.

7. The computer storage medium of claim 6, wherein:
    the first type touch-point includes a user interface in communication with the stub and wherein the stub sends user interface control information to the user interface in response to receiving commands from the first object.

8. The computer storage medium of claim 7, wherein the user interface comprises a browser.

9. The computer storage medium of claim 5, wherein the stub and the object communicate via a communications protocol other than the Hyper Text Transfer Protocol (HTTP).

10. The computer storage medium of claim 5, wherein the first type touch-point is selected from the group consisting of personal computers, server computers, hand-held communications devices, laptop computers, personal digital assistants (PDAs), cellular devices, web enable telephones, set top boxes, programmable consumer electronics, and network PCs.

11. The computer storage medium of claim 5, wherein the object includes presentation logic.

12. The computer storage medium of claim 5, wherein the user events are selected from the group consisting of mouse movements, keyboard entries, keypad entries, and button clicks.

13. A computer storage medium having stored thereon computer executable instructions for facilitating communications between a touch-point having predetermined attributes, a user interface and a server process in a communications network, the computer executable instructions comprising:
- a stub comprising computer executable code resident on the touch-point and in operable connection with the user interface, the stub issuing an object request, wherein the stub is selected based at least in part on the predetermined attributes of the touch-point and on correspondence with a first object of a plurality of objects associated with respective types of touch-points, wherein the first object is associated with the first touch-point, and wherein the stub is configured to format and transmit user events to the first object and respond to commands from the first object, the user events comprising user interactions with the touch-point;
- an object comprising computer executable code in operable connection with the stub and with the server process, the object facilitating the transfer of information between the server process and the stub; and
- a service comprising computer executable code in operable connection with the stub and with the object, the service initializing communication between the stub and the object in response to the object request from the stub.

14. The computer storage medium of claim 13, wherein the user events are selected from the group consisting of mouse movements, keyboard entries, keypad entries, and button clicks.

* * * * *